(12) United States Patent
Yang et al.

(10) Patent No.: US 12,058,677 B2
(45) Date of Patent: Aug. 6, 2024

(54) SYSTEM AND METHOD FOR DETERMINING DOWNLINK CONTROL INFORMATION

(71) Applicant: ZTE CORPORATION, Guangdong (CN)

(72) Inventors: Weiwei Yang, Shenzhen (CN); Bo Dai, Shenzhen (CN); Huiying Fang, Shenzhen (CN); Kun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/889,726

(22) Filed: Aug. 17, 2022

(65) Prior Publication Data

US 2022/0400506 A1 Dec. 15, 2022

Related U.S. Application Data

(63) Continuation of application No. PCT/CN2020/075815, filed on Feb. 19, 2020.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04L 5/16* (2013.01)

(58) Field of Classification Search
CPC ............. H04W 72/1273; H04L 1/1812; H04L 5/0053; H04L 5/16; H04L 5/053; H04L 5/0055; H04L 72/1273
See application file for complete search history.

(56) References Cited

U.S. PATENT DOCUMENTS 10,531,479 B2 1/2020 Jung et al.
11,296,827 B2 * 4/2022 Yang ..................... H04L 1/1861
(Continued)

FOREIGN PATENT DOCUMENTS

CN 111147208 A 5/2020

OTHER PUBLICATIONS

International Search Report and Written Opinion for PCT Appl. No. PCT/CN2020/075815 mailed Nov. 9, 2020. (9 pages).
(Continued)

*Primary Examiner* — Hanh N Nguyen
(74) *Attorney, Agent, or Firm* — Foley & Lardner LLP

(57) ABSTRACT

A system and method of providing a mechanism for determining control information, such as PDSCH scheduling delay and/or HARQ-ACK delay. The system and method include receiving, by a wireless communication device from a wireless communication node, a control signal indicating one of a plurality of physical downlink shared channel (PDSCH) scheduling delays and one of a plurality of hybrid automatic repeat request-acknowledgement (HARQ-ACK) delays; receiving, by the wireless communication device from the wireless communication node, based on the PDSCH scheduling delays, a PDSCH; transmitting, by the wireless communication device to the wireless communication node, based on the HARQ-ACK delays, a HARQ-ACK that corresponds to the received PDSCH.

14 Claims, 20 Drawing Sheets

| HARQ-ACK Delay Domain | PDSCH Scheduling Delay | HARQ-ACK Feedback Delay |
|---|---|---|
| 0000 | 2 | 4 |
| 0001 | 2 | 5 |
| 0010 | 2 | 6 |
| 0011 | 2 | 7 |
| 0100 | 2 | 8 |
| 0101 | 2 | 9 |
| 0110 | 2 | 10 |
| 0111 | 2 | 11 |
| 1000 | 2 | 13 |
| 1001 | 2 | 15 |
| 1010 | 2 | 17 |
| 1011 | 7 | 12 |
| 1100 | 7 | 13 |
| 1101-1111 | Keep | |

(51) Int. Cl.
   *H04L 5/00*      (2006.01)
   *H04L 5/16*      (2006.01)

(56) References Cited

U.S. PATENT DOCUMENTS

| | | | |
|---|---|---|---|
| 11,456,825 B2* | 9/2022 | Khoshnevisan | H04L 5/0055 |
| 2018/0367263 A1* | 12/2018 | Ying | H04L 1/1854 |
| 2019/0173651 A1 | 6/2019 | Zhang | |
| 2019/0313385 A1* | 10/2019 | Yang | H04L 5/0094 |
| 2020/0100276 A1* | 3/2020 | Oh | H04W 16/14 |
| 2020/0367263 A1* | 11/2020 | Cavalcanti | H04W 72/12 |
| 2021/0219329 A1* | 7/2021 | Zhou | H04L 1/189 |
| 2021/0314084 A1* | 10/2021 | Hwang | H04L 1/1819 |
| 2021/0345388 A1* | 11/2021 | Huang | H04W 72/1257 |
| 2022/0231820 A1* | 7/2022 | Zaki | H04W 72/23 |
| 2022/0377774 A1* | 11/2022 | Rico Alvarino | H04L 5/0053 |
| 2023/0239873 A1* | 7/2023 | Zhang | H04L 5/0055 370/329 |

OTHER PUBLICATIONS

Qualcomm Incorporated et al.: "Increased peak data rate for HD-FDD MTC UEs" 3GPP TSG RAN WG1 #98b, R1-1910735 Oct. 4, 2019(Oct. 4, 2019) Chongqing, PR China (5 pages).

Qualcomm Incorporated et al.: "Increased peak data rate for HD-FDD MTC UEs" 3GPP TSG RAN WG1 #99, R1-1912694, Reno, USA Nov. 8, 2019(Nov. 8, 2019) (8 pages).

* cited by examiner

FIG. 2B

| 'HARQ-ACK delay' field in DCI | HARQ-ACK delay value when 'HARQACKDelayType' set to 0 | HARQ-ACK delay value when 'HARQACKDelayType' set to 1 |
|---|---|---|
| 000 | 4 | 4 |
| 001 | 5 | 5 |
| 010 | 7 | 6 |
| 011 | 9 | 7 |
| 100 | 11 | 8 |
| 101 | 13 | 9 |
| 110 | 15 | 10 |
| 111 | 17 | 11 |

FIG. 6

| "HARQ-ACK delay" field in DCI | Used HARQ ID | Scheduling delay for PDSCH |
|---|---|---|
| 000 | 10 | 2 |
| 001 | 10 | 7 |
| 010 | 11 | 2 |
| 011 | 11 | 7 |
| 100 | 12 | 2 |
| 101 | 12 | 7 |
| 110 | 13 | 2 |
| 111 | 13 | 7 |

FIG. 7

| 'HARQ-ACK delay' field in DCI | HARQ-ACK delay value when ce-pdsch-fourteenProcesses' is set |
|---|---|
| 000 | 4 |
| 001 | 5 |
| 010 | 6 |
| 011 | 7 |
| 100 | 9 |
| 101 | 11 |
| 110 | 13 |
| 111 | 15 |

| Second Control Domain | HARQ-ACK Delay Domain | PDSCH Scheduling Delay | HARQ-ACK Feedback Delay |
|---|---|---|---|
| 0 | 000 | 2 | 4 |
|   | 001 | 2 | 5 |
|   | 010 | 2 | 6 |
|   | 011 | 2 | 7 |
|   | 100 | 2 | 8 |
|   | 101 | 2 | 9 |
|   | 110 | 2 | 10 |
|   | 111 | 2 | 11 |
| 1 | 000 | 2 | 13 |
|   | 001 | 2 | 15 |
|   | 010 | 2 | 17 |
|   | 011 | 7 | 12 |
|   | 100 | 7 | 13 |
|   | 101~111 | Keep |  |

| HARQ Process Domain | HARQ-ACK Delay Domain | HARQ Process Index | HARQ-ACK Feedback Delay | PDSCH Scheduling Delay |
|---|---|---|---|---|
| 1,0 | 000 | 1,0 | 4 | 2 |
| | 001 | 1,0 | 5 | 2 |
| | 010 | 1,0 | 7 | 2 |
| | 011 | 1,0 | 9 | 2 |
| | 100 | 1,0 | 12 | 2 |
| | 101 | 1,0 | 13 | 2 |
| | 110 | 1,0 | 14 | 2 |
| | 111 | 1,0 | 15 | 2 |
| 1,1 | 000 | 1,1 | 4 | 2 |
| | 001 | 1,1 | 5 | 2 |
| | 010 | 1,1 | 7 | 2 |
| | 011 | 1,1 | 9 | 2 |
| | 100 | 1,1 | 12 | 2 |
| | 101 | 1,1 | 13 | 2 |
| | 110 | 1,1 | 14 | 2 |
| | 111 | 1,1 | 15 | 2 |
| 1,2 | 000 | 1,2 | 4 | 2 |
| | 001 | 1,2 | 5 | 2 |
| | 010 | 1,2 | 7 | 2 |
| | 011 | 1,2 | 9 | 2 |
| | 100 | 1,2 | 12 | 2 |
| | 101 | 1,2 | 13 | 2 |
| | 110 | 1,2 | 14 | 2 |
| | 111 | 1,2 | 15 | 2 |
| 1,3 | 000 | 1,3 | 4 | 2 |
| | 001 | 1,3 | 5 | 2 |
| | 010 | 1,3 | 7 | 2 |
| | 011 | 1,3 | 9 | 2 |
| | 100 | 1,3 | 12 | 2 |
| | 101 | 1,3 | 13 | 2 |
| | 110 | 1,3 | 14 | 2 |
| | 111 | 1,3 | 15 | 2 |
| 1,4 | 000 | 1,0 | 6 | 2 |
| | 001 | 1,0 | 8 | 2 |
| | 010 | 1,0 | 10 | 2 |
| | 011 | 1,0 | 11 | 2 |
| | 100 | 1,1 | 6 | 2 |
| | 101 | 1,1 | 8 | 2 |
| | 110 | 1,1 | 10 | 2 |
| | 111 | 1,1 | 11 | 2 |
| 1,5 | 000 | 1,2 | 6 | 2 |
| | 001 | 1,2 | 8 | 2 |
| | 010 | 1,2 | 10 | 2 |
| | 011 | 1,2 | 11 | 2 |
| | 100 | 1,3 | 6 | 2 |
| | 101 | 1,3 | 8 | 2 |
| | 110 | 1,3 | 10 | 2 |
| | 111 | 1,3 | 11 | 2 |

1300

1400 receiving, by a wireless communication device from a wireless communication node, a control signal indicating one of a plurality of physical downlink shared channel (PDSCH) scheduling delays and one of a plurality of hybrid automatic repeat request-acknowledgement (HARQ-ACK) delays
1402 receiving, by the wireless communication device from the wireless communication node, based on the PDSCH scheduling delay, a PDSCH
1404 transmitting, by the wireless communication device to the wireless communication node, based on the HARQ-ACK delay, a HARQ-ACK that corresponds to the received PDSCH
1406

receiving, by a wireless communication device from a wireless communication node, a control signal indicating one of a plurality of hybrid automatic repeat request (HARQ) process numbers, one of a plurality of physical downlink shared channel (PDSCH) scheduling delays, and one of a plurality of hybrid automatic repeat request-acknowledgement (HARQ-ACK) delays
1502

receiving, by the wireless communication device from the wireless communication node, based on the PDSCH scheduling delay, a PDSCH
1504

transmitting, by the wireless communication device to the wireless communication node, based on the HARQ-ACK delay, a HARQ-ACK that corresponds to the PDSCH
1506

transmitting, by a wireless communication node to a wireless communication device, a control signal indicating one of a plurality of physical downlink shared channel (PDSCH) scheduling delays and one of a plurality of hybrid automatic repeat request-acknowledgement (HARQ-ACK) delays
1702 transmitting, by the wireless communication node to the wireless communication device, a PDSCH
1704 receiving, by the wireless communication node from the wireless communication device, a HARQ-ACK that corresponds to the received PDSCH
1706

FIG. 17

1900 transmitting, by a wireless communication node to a wireless communication device, a control signal indicating one of a plurality of hybrid automatic repeat request-acknowledgement (HARQ-ACK) delays
1902 transmitting, by the wireless communication node to the wireless communication device, a physical downlink shared channel (PDSCH)
1904 receiving, by the wireless communication node to the wireless communication device, a HARQ-ACK that corresponds to the received PDSCH
1906

FIG. 19

SYSTEM AND METHOD FOR DETERMINING DOWNLINK CONTROL INFORMATION

CROSS-REFERENCE TO RELATED APPLICATION

This application claims the benefit of priority under 35 U.S.C. § 120 as a continuation of PCT Patent Application No. PCT/CN2020/075815, filed on Feb. 19, 2020, the disclosure of which is incorporated herein by reference in its entirety.

TECHNICAL FIELD

The disclosure relates generally to wireless communications and, more particularly, to systems and methods for determining downlink control information.

BACKGROUND

The standardization organization Third Generation Partnership Project (3GPP) is currently in the process of specifying a new Radio Interface called 5G New Radio (5G NR). With the development of 5G NR, a broad range of use cases including massive machine-type communications (MTC) can be realized. MTC Physical Downlink Control Channel (MPDCCH) is a special type of PDCCH designed for bandwidth-reduced operation.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes receiving, by a wireless communication device (e.g., UE 304 in FIG. 3) from a wireless communication node (e.g., BS 302 in FIG. 3, a control signal indicating one of a plurality of physical downlink shared channel (PDSCH) scheduling delays and one of a plurality of hybrid automatic repeat request-acknowledgement (HARQ-ACK) delays. In some embodiments, the method includes receiving, by the wireless communication device from the wireless communication node, based on the PDSCH scheduling delays, a PDSCH. In some embodiments, the method includes transmitting, by the wireless communication device to the wireless communication node, based on the HARQ-ACK delays, a HARQ-ACK that corresponds to the received PDSCH.

In some embodiments, the control signal includes a first field and a second field configured to collectively indicate a combination of the physical PDSCH scheduling delays and/or the HARQ-ACK delays, the first field having 1 bit, the second field having 3 bits.

In some embodiments, the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13}.

In some embodiments, the control signal includes a field configured to indicate the combination of the physical PDSCH scheduling delays and the HARQ-ACK delays, the field having 4 bits.

In some embodiments, the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13}.

In some embodiments, the wireless communication device includes a half-duplex user equipment.

In another embodiments, a method includes receiving, by a wireless communication device from a wireless communication node, a control signal indicating one of a plurality of hybrid automatic repeat request (HARQ) process numbers, one of a plurality of physical downlink shared channel (PDSCH) scheduling delays, and/or one of a plurality of hybrid automatic repeat request-acknowledgement (HARQ-ACK) delays. In some embodiments, the method includes receiving, by the wireless communication device from the wireless communication node, based the PDSCH scheduling delays, a PDSCH. In some embodiments, the method includes transmitting, by the wireless communication device to the wireless communication node, based on the HARQ-ACK delays, a HARQ-ACK that corresponds to the PDSCH.

In some embodiments, the control signal includes a HARQ process field and a HARQ-ACK delay field configured to collectively indicate a combination of the HARQ process number, the PDSCH scheduling delay, and/or the HARQ-ACK delay.

In some embodiments, the combination is selected from at least one of: {10, 2, 4}, {10, 2, 5}, {10, 2, 6}, {10, 2, 7}, {10, 2, 8}, {10, 2, 9}, {10, 2, 10}, {10, 2, 11}, {10, 2, 13}, {10, 2, 15}, {10, 2, 17}, {10, 7, 12}, {10, 7, 13}, {10, 7, 14}, {10, 7, 15}, {11, 2, 4}, {11, 2, 5}, {11, 2, 6}, {11, 2, 7}, {11, 2, 8}, {11, 2, 9}, {11, 2, 10}, {11, 2, 11}, {11, 2, 13}, {11, 2, 15}, {11, 2, 17}, {11, 7, 12}, {11, 7, 13}, {11, 7, 14}, {11, 7, 15}, {12, 2, 4}, {12, 2, 5}, {12, 2, 6}, {12, 2, 7}, {12, 2, 8}, {12, 2, 9}, {12, 2, 10}, {12, 2, 11}, {12, 2, 13}, {12, 2, 15}, {12, 2, 17}, {12, 7, 12}, {12, 7, 13}, {12, 7, 14}, {12, 7, 15}, {13, 2, 4}, {13, 2, 5}, {13, 2, 6}, {13, 2, 7}, {13, 2, 8}, {13, 2, 9}, {13, 2, 10}, {13, 2, 11}, {13, 2, 13}, {13, 2, 15}, {13, 2, 17}, {13, 7, 12}, {13, 7, 13}, {13, 7, 14}, {13, 7, 15}.

In some embodiments, the wireless communication device includes a half-duplex user equipment.

In another embodiments, a method includes receiving, by a wireless communication device from a wireless communication node, a control signal indicating one of a plurality of hybrid automatic repeat request-acknowledgement (HARQ-ACK) delays. In some embodiments, the method includes receiving, by the wireless communication device from the wireless communication node, a physical downlink shared channel (PDSCH). In some embodiments, the method includes transmitting, by the wireless communication device to the wireless communication node, at a timing determined based on the HARQ-ACK delay indicated in the control signal, a HARQ-ACK that corresponds to the received PDSCH.

In some embodiments, the control signal includes a field, having 4 bits, that is configured to indicate the HARQ-ACK delay.

In some embodiments, the HARQ-ACK delay is selected from: 0, 1, 2, 3, 4, 5, 6, 7, 8, 9, 10, 11, 12, 13, 14, and 15.

In some embodiments, the control signal includes a first field, having 3 bits, and a second field, having 1 bit, that are configured to collectively indicate the HARQ-ACK delay.

In some embodiments, the HARQ-ACK delay is selected from: 0, 1, 2, 3, 4, 5, 6, 7, 8, 9, 10, 11, 12, 13, 14, and 15.

In some embodiments, the control signal includes a field, having up to 4 bits, that is configured to indicate the HARQ-ACK delay.

In some embodiments, the HARQ-ACK delay is selected from one of up to 16 values allocated in higher layer signaling.

In some embodiments, the HARQ-ACK delay is selected from one of first value set when the received PDSCH is located in the first slot, the HARQ-ACK delay is selected from one of second value set when the received PDSCH is located in the second slot.

In some embodiments, an index of the first slot is at least one of: an odd number, equal to or less than a threshold, corresponding to all slots of an odd number frame, or predefined slot and wherein an index of the second slot is at least one of: an even number, or greater than the threshold, corresponding to all slots of an even number frame, or predefined slot.

In some embodiments, the HARQ-ACK delay is selected from one of a first value set when the received PDSCH is associated with a first HARQ process. In some embodiments, the HARQ-ACK delay is selected from one of a second value set when the received PDSCH is associated with a second HARQ process.

In some embodiments, an index of the first HARQ process is at least one of: an odd number, equal to or less than a threshold, or predefined HARQ process. In some embodiments, an index of the second HARQ process is at least one of: an even number, or greater than the threshold, or predefined HARQ process.

In some embodiments, the HARQ-ACK delay is selected from one of first value set when the control signal is allocated in the a first control resource set, the HARQ-ACK delay is selected from one of a second value set when the control signal is allocated in the second control resource set.

In some embodiments, an index of the first control resource set is at least one of: an odd number, or a predefined control resource set. In some embodiments, an index of the second control resource set is an even number, or predefined control resource set.

In some embodiments, the first value set is configured by higher layer signaling or predefined, and the second value set is configured by higher layer signaling or predefined.

In another embodiment, a method includes transmitting, by a wireless communication node to a wireless communication device, a control signal indicating one of a plurality of physical downlink shared channel (PDSCH) scheduling delays and/or one of a plurality of hybrid automatic repeat request-acknowledgement (HARQ-ACK) delays. In some embodiments, the method includes transmitting, by the wireless communication node to the wireless communication device, a PDSCH In some embodiments, the method includes receiving, by the wireless communication node from the wireless communication device, the HARQ-ACK that corresponds to the transmitted PDSCH.

In some embodiments, the control signal includes a first field and a second field configured to collectively indicate a combination of the PDSCH scheduling delay and the HARQ-ACK delay, the first field having 1 bit, the second field having 3 bits.

In some embodiments, the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13}.

In some embodiments, the control signal includes a field configured to indicate a combination of the PDSCH scheduling delay and/or the HARQ-ACK delay, the field having 4 bits.

In some embodiments, the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13}.

In some embodiments, the wireless communication device includes a half-duplex user equipment.

In another embodiment, a method includes transmitting, by a wireless communication node to a wireless communication device, a control signal indicating one of a plurality of hybrid automatic repeat request (HARQ) process numbers, one of a plurality of physical downlink shared channel (PDSCH) scheduling delays, and/or one of a plurality of hybrid automatic repeat request-acknowledgement (HARQ-ACK) delays.

In some embodiments, the method includes transmitting, by the wireless communication node to the wireless communication device, a PDSCH. In some embodiments, the method includes receiving, by the wireless communication node from the wireless communication device, the HARQ-ACK that corresponds to the transmitted PDSCH.

In some embodiments, the control signal includes a HARQ process field and/or a HARQ-ACK delay field configured to collectively indicate a combination of the HARQ process number, the PDSCH scheduling delay, and/or the HARQ-ACK delay.

In some embodiments, the combination is selected from at least one of: {10, 2, 4}, {10, 2, 5}, {10, 2, 6}, {10, 2, 7}, {10, 2, 8}, {10, 2, 9}, {10, 2, 10}, {10, 2, 11}, {10, 2, 13}, {10, 2, 15}, {10, 2, 17}, {10, 7, 12}, {10, 7, 13}, {10, 7, 14}, {10, 7, 15}, {11, 2, 4}, {11, 2, 5}, {11, 2, 6}, {11, 2, 7}, {11, 2, 8}, {11, 2, 9}, {11, 2, 10}, {11, 2, 11}, {11, 2, 13}, {11, 2, 15}, {11, 2, 17}, {11, 7, 12}, {11, 7, 13}, {11, 7, 14}, {11, 7, 15}, {12, 2, 4}, {12, 2, 5}, {12, 2, 6}, {12, 2, 7}, {12, 2, 8}, {12, 2, 9}, {12, 2, 10}, {12, 2, 11}, {12, 2, 13}, {12, 2, 15}, {12, 2, 17}, {12, 7, 12}, {12, 7, 13}, {12, 7, 14}, {12, 7, 15}, {13, 2, 4}, {13, 2, 5}, {13, 2, 6}, {13, 2, 7}, {13, 2, 8}, {13, 2, 9}, {13, 2, 10}, {13, 2, 11}, {13, 2, 13}, {13, 2, 15}, {13, 2, 17}, {13, 7, 12}, {13, 7, 13}, {13, 7, 14}, {13, 7, 15}.

In some embodiments, the wireless communication device includes a half-duplex user equipment.

In another embodiment, a method includes transmitting, by a wireless communication node to a wireless communication device, a control signal indicating one of a plurality of hybrid automatic repeat request-acknowledgement (HARQ-ACK) delays. In some embodiments, the method includes transmitting, by the wireless communication node to the wireless communication device, a physical downlink shared channel (PDSCH). In some embodiments, the method includes receiving, by the wireless communication node to the wireless communication device, the HARQ-ACK that corresponds to the transmitted PDSCH.

In some embodiments, the control signal includes a field, having 4 bits, that is configured to indicate the HARQ-ACK delay.

In some embodiments, the HARQ-ACK delay is selected from: 0, 1, 2, 3, 4, 5, 6, 7, 8, 9, 10, 11, 12, 13, 14, and 15.

In some embodiments, the control signal includes a first field, having 3 bits, and/or a second field, having 1 bit, that are configured to collectively indicate the HARQ-ACK delay.

In some embodiments, the HARQ-ACK delay is selected from: 0, 1, 2, 3, 4, 5, 6, 7, 8, 9, 10, 11, 12, 13, 14, and 15.

In some embodiments, the control signal includes a field, having up to 4 bits, that is configured to indicate the HARQ-ACK delay.

In some embodiments, the HARQ-ACK delay is selected from one of up to 16 values allocated in higher layer signaling.

In some embodiments, the HARQ-ACK delay is selected from one of a first value set when the received PDSCH is located in a first slot, the HARQ-ACK delay is selected from one of a second value set when the received PDSCH is located in a second slot.

In some embodiments, an index of the first slot is at least one of: an odd number, equal to or less than a threshold, corresponding to all slots of an odd number frame, or predefined slot. In some embodiments, an index of the second slot is at least one of: an even number, or greater than the threshold, corresponding to all slots of an even number frame, or predefined slot.

In some embodiments, the HARQ-ACK delay is selected from one of a first value set when the received PDSCH is associated with a first HARQ process, the HARQ-ACK delay is selected from one of a second value set when the received PDSCH is associated with a second HARQ process.

In some embodiments, an index of the first HARQ process is at least one of: an odd number, equal to or less than a threshold, or predefined HARQ process. In some embodiments, an index of the second HARQ process is at least one of: an even number, greater than the threshold, or predefined HARQ process.

In some embodiments, the HARQ-ACK delay is selected from one of a first value set when the control signal is allocated in the first control resource set, the HARQ-ACK delay is selected from one of a second value set when the control signal is allocated in the second control resource set. In some embodiments, an index of the first control resource set is at least one of: an odd number, or a predefined control resource set. In some embodiments, an index of the second control resource set is an even number, or predefined control resource set.

In some embodiments, the first value set is configured by higher layer signaling or predefined, and/or the second value set is configured by higher layer signaling or predefined.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2B illustrates an example table of HARQ-ACK feedback delay values transmitted in two uplink subframes, in accordance with an embodiment of the present disclosure.

FIG. 6 illustrates an example table of HARQ-ACK delay, in accordance with a conventional embodiment.

FIG. 7 illustrates an example table of HARQ-ACK delay, in accordance with a conventional embodiment.

FIG. 10 illustrates an example table of feedback delay of HARQ-ACK delay, in accordance with some embodiments of the present disclosure.

FIG. 11 illustrates an example table of HARQ-ACK delay, in accordance with some embodiments of the present disclosure.

FIG. 13 illustrates an example table of feedback delay of HARQ-ACK delay, in accordance with some embodiments of the present disclosure.

FIG. 14 is a flow diagram depicting a method for determining downlink control information, in accordance with some embodiments of the present disclosure.

FIG. 15 is a flow diagram depicting a method for determining downlink control information, in accordance with some embodiments of the present disclosure.

FIG. 17 is a flow diagram depicting a method for determining downlink control information, in accordance with some embodiments of the present disclosure.

FIG. 19 is a flow diagram depicting a method for determining downlink control information, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:
3GPP 3rd Generation Partnership Project
5G 5th Generation Mobile Networks
5G-AN 5G Access Network
5G gNB Next Generation NodeB
DCI Downlink Control Information
DL Down Link or Downlink
HARQ-ACK Hybrid Automatic Repeat Request-Acknowledge
MAC Media Access Control
MPDCCH MTC Physical Downlink Control Channel
MTC Machine-Type Communications
NR Next Generation RAN
PDCCH Physical Downlink Control Channel
PDSCH Physical Downlink Shared Channel
PUCCH Physical Uplink Control Channel
PUSCH Physical Uplink Shared Channel
RAN Radio Access Network
RRC Radio Resource Control
UE User Equipment
UL Up Link or Uplink In the Rel-17 Machine Type Communication (MTC) system, for half-duplex terminals, the downlink (DL) needs to support 14 HARQ processes, but the Physical Downlink Shared Channel (PDSCH) scheduling delay and HARQ-ACK feedback delay have not given specific instructions. In a NR system, for DCI format1_0 scheduling, the HARQ-ACK feedback delay field is 3 bits and the value is {1, 2, 3, 4, 5, 6, 7, 8}. In a NR system, for DCI format1_1 scheduling, the HARQ-ACK feedback delay field is 0, 1, 2, 3 bits, depending on the number of values configured by the higher layer.

Figure 1:
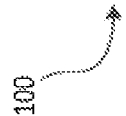
FIG. 1 illustrates an example table of PDSCH-to-HARQ_feedback timing indicators to a number of slots (k), in accordance with an embodiment of the present disclosure.

For example, FIG. 1 illustrates an example table of PDSCH-to-HARQ_feedback timing indicators to a number of slots (k), in accordance with an embodiment of the present disclosure. As shown, dl-DataToUL-ACK corresponds to a SEQUENCE (SIZE (1 . . . 8)) OF INTEGER (0 . . . 15). That is, a maximum of 8 values can be configured in {0~15}.

Figure 2A:
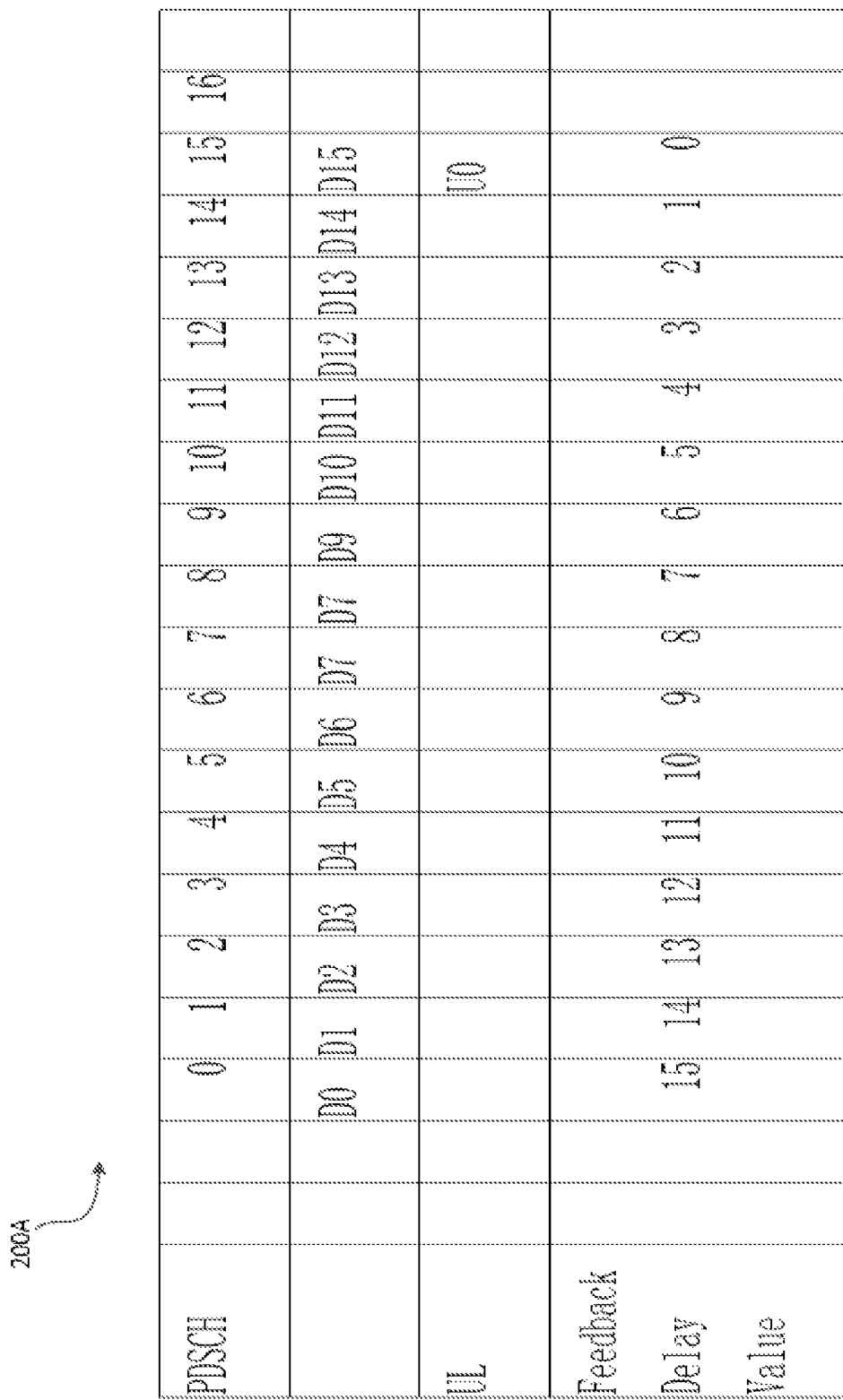
FIG. 2A illustrates an example table of HARQ-ACK feedback delay values transmitted in an uplink subframe, in accordance with an embodiment of the present disclosure.

For half-duplex UEs, in order to ensure the peak data rate, HARQ-ACK feedback delay values are required to ensure that multiple downlink PDSCH feedbacks are sent in the same subframe. For example, FIG. 2A illustrates an example table of HARQ-ACK feedback delay values transmitted in an uplink subframe, in accordance with an embodiment of the present disclosure. As shown, the PDSCH corresponding to the 16 HARQ processes may all fed back at U0.

Figure 2B:
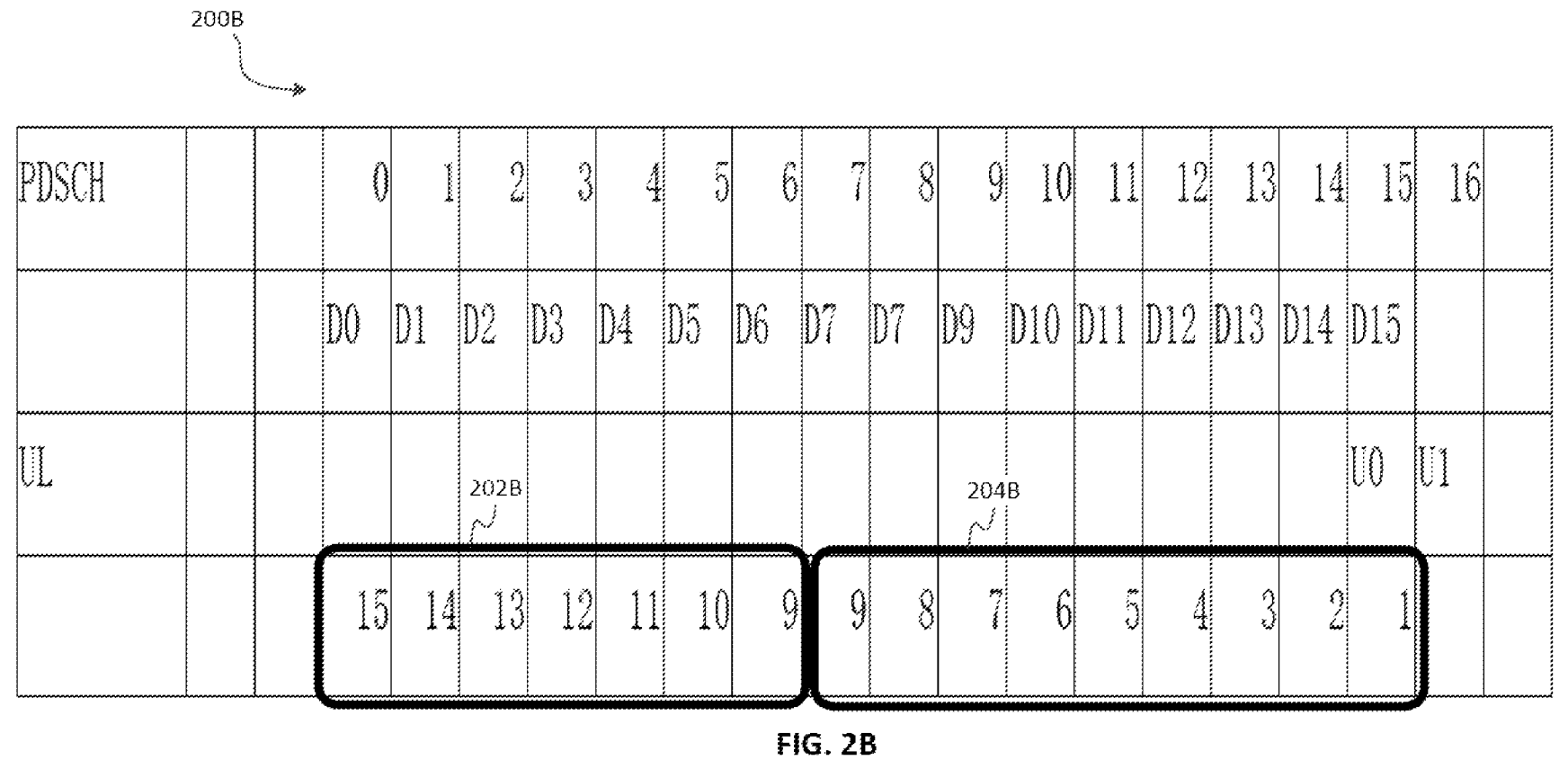

As another example, FIG. 2B illustrates an example table of HARQ-ACK feedback delay values transmitted in two uplink subframes, in accordance with an embodiment of the present disclosure. As shown, the table 200B includes a first downlink group 202B and a second downlink group 204B.

In some embodiments, the first downlink group 202B may be sent to U0 and the second downlink group 202B may be sent to U1.

However, as shown in FIGS. 2A and 2B, the scheduling delay field in the existing DCI indicates that a maximum of 8 values cannot satisfy all feedback situations. Thus, the conventional 5G NR systems, cannot flexibly support feedback of HARQ-ACK delays in order to guarantee the downlink peak data rate.

Accordingly, the system and method discussed herein provide a mechanism for determining control information, such as PDSCH scheduling delay and/or HARQ-ACK feedback delay.

In general, as discussed in greater detail below, a UE (e.g., UE 304 in FIG. 3) may receive a PDSCH scheduling delay (e.g., the time difference between the ending slot/subframe of DCI (control information/signal) and corresponding PDSCH) and a HARQ-ACK delay (e.g., the time difference between the ending slot/subframe of PDSCH and corresponding ACK/NACK feedback) from a BS (e.g., BS 302 in FIG. 3). The UE may use the PDSCH scheduling delay to determine (e.g., detect, identify, calculate, etc.) where and/or when to receive PDSCH. Thereafter, the UE may receive a PDSCH. Based on the HARQ-ACK delay, the UE may transmit (e.g., send, deliver, broadcast, etc.) an ACK/NACK feedback that corresponds to the received PDSCH.

1. Mobile Communication Technology and Environment

Figure 3:
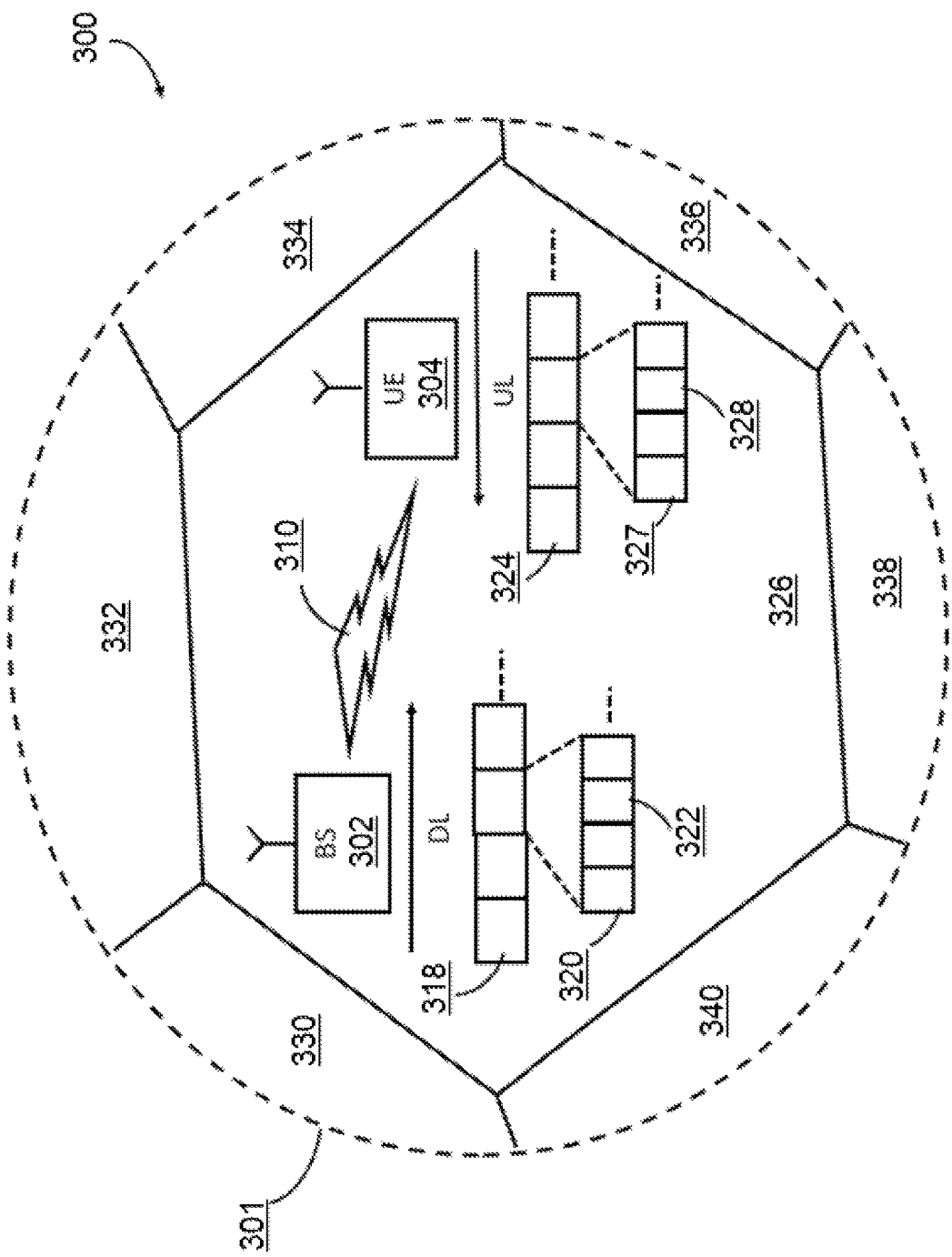
FIG. 3 illustrates an example wireless communication network, and/or system, 300 in which techniques disclosed herein may be implemented, in accordance with an embodiment of the present disclosure.

FIG. 3 illustrates an example wireless communication network, and/or system, 300 in which techniques disclosed herein may be implemented, in accordance with an embodiment of the present disclosure. In the following discussion, the wireless communication network 300 may be any wireless network, such as a cellular network or a narrowband Internet of things (NB-IoT) network, and is herein referred to as "network 300." Such an example network 300 includes a base station 302 (hereinafter "BS 302"; also referred to as wireless communication node) and a user equipment device 304 (hereinafter "UE 304"; also referred to as wireless communication device) that can communicate with each other via a communication link 310 (e.g., a wireless communication channel), and a cluster of cells 326, 330, 332, 334, 336, 338 and 340 overlaying a geographical area 301. In FIG. 3, the BS 302 and UE 304 are contained within a respective geographic boundary of cell 326. Each of the other cells 330, 332, 334, 336, 338 and 340 may include at least one base station operating at its allocated bandwidth to provide adequate radio coverage to its intended users.

For example, the BS 302 may operate at an allocated channel transmission bandwidth to provide adequate coverage to the UE 304. The BS 302 and the UE 304 may communicate via a downlink radio frame 318, and an uplink radio frame 324 respectively. Each radio frame 318/324 may be further divided into sub-frames 320/327 which may include data symbols 322/328. In the present disclosure, the BS 302 and UE 304 are described herein as non-limiting examples of "communication nodes," generally, which can practice the methods disclosed herein. Such communication nodes may be capable of wireless and/or wired communications, in accordance with various embodiments of the present solution.

Figure 4:
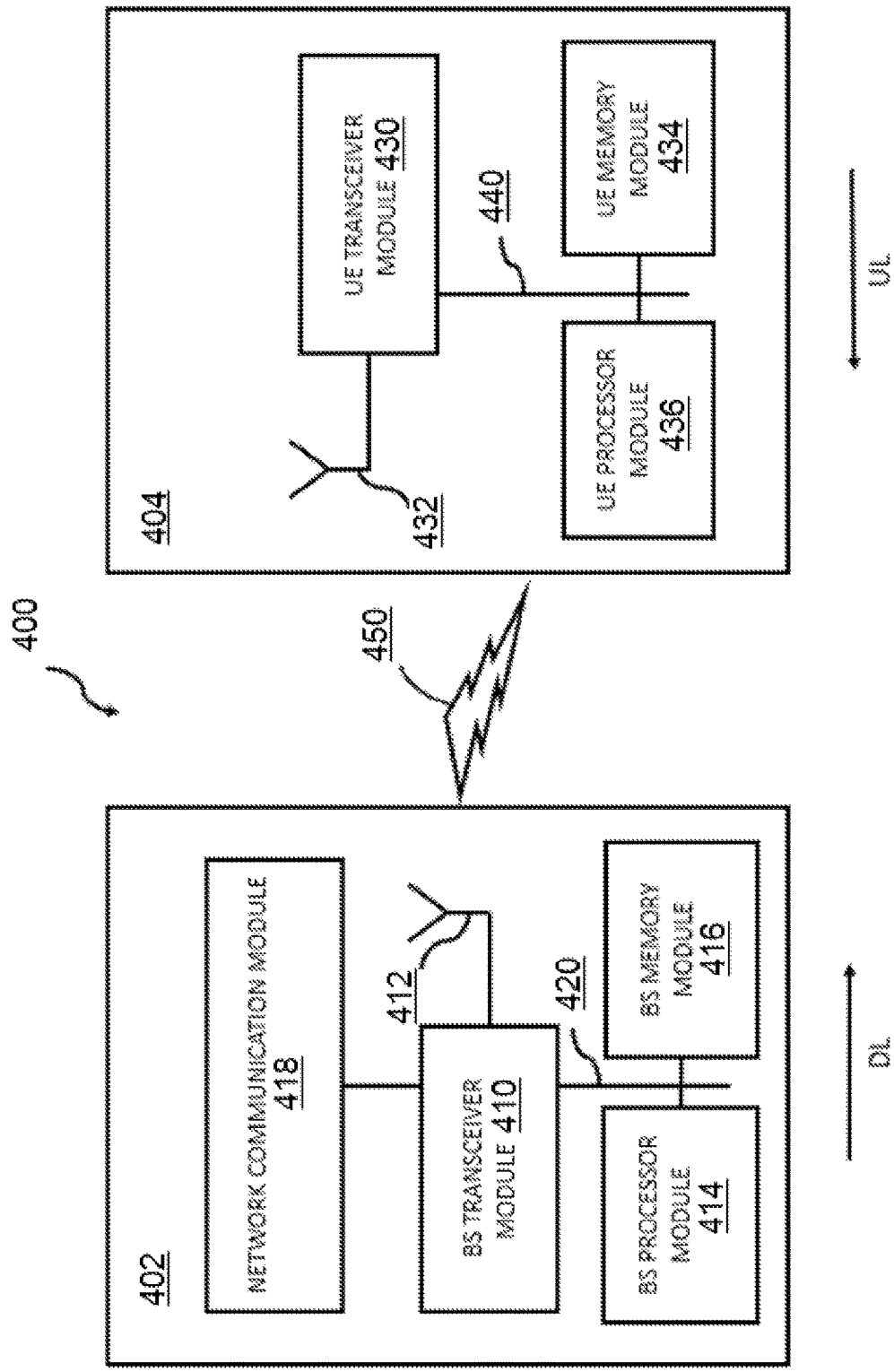
FIG. 4 illustrates a block diagram of an example wireless communication system 400 for transmitting and receiving wireless communication signals (e.g., OFDM/OFDMA signals) in accordance with some embodiments of the present disclosure.

FIG. 4 illustrates a block diagram of an example wireless communication system 400 for transmitting and receiving wireless communication signals (e.g., OFDM/OFDMA signals) in accordance with some embodiments of the present disclosure. The system 400 may include components and elements configured to support known or conventional operating features that need not be described in detail herein. In one illustrative embodiment, system 400 can be used to communicate (e.g., transmit and receive) data symbols in a wireless communication environment such as the wireless communication environment 300 of FIG. 3, as described above.

System 400 generally includes a base station 402 (hereinafter "BS 402") and a user equipment device 404 (hereinafter "UE 404"). The BS 402 includes a BS (base station) transceiver module 410, a BS antenna 412, a BS processor module 414, a BS memory module 416, and a network communication module 418, each module being coupled and interconnected with one another as necessary via a data communication bus 420. The UE 404 includes a UE (user equipment) transceiver module 430, a UE antenna 432, a UE memory module 434, and a UE processor module 436, each module being coupled and interconnected with one another as necessary via a data communication bus 440. The BS 402 communicates with the UE 404 via a communication channel 450, which can be any wireless channel or other medium suitable for transmission of data as described herein.

As would be understood by persons of ordinary skill in the art, system 400 may further include any number of modules other than the modules shown in FIG. 4. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 430 may be referred to herein as an "uplink" transceiver 430 that includes a radio frequency (RF) transmitter and a RF receiver each comprising circuitry that is coupled to the antenna 432. A duplex switch (not shown) may alternatively couple the uplink transmitter or receiver to the uplink antenna in time duplex fashion. Similarly, in accordance with some embodiments, the BS transceiver 410 may be referred to herein as a "downlink" transceiver 410 that includes a RF transmitter and a RF receiver each comprising circuitry that is coupled to the antenna 412. A downlink duplex switch may alternatively couple the downlink transmitter or receiver to the downlink antenna 212 in time duplex fashion. The operations of the two transceiver modules 410 and 430 may be coordinated in time such that the uplink receiver circuitry is coupled to the uplink antenna 432 for reception of transmissions over the wireless transmission link 450 at the same time that the downlink transmitter is coupled to the downlink antenna 412. Conversely, the operations of the two transceivers 410 and 430 may be coordinated in time such that the downlink receiver is coupled to the downlink antenna 412 for reception of transmissions over the wireless transmission link 450 at the same time that the uplink transmitter is coupled to the uplink antenna 432.

In some embodiments, there is close time synchronization with a minimal guard time between changes in duplex direction.

The UE transceiver 430 and the base station transceiver 410 are configured to communicate via the wireless data communication link 450, and cooperate with a suitably configured RF antenna arrangement 412/432 that can support a particular wireless communication protocol and modulation scheme. In some illustrative embodiments, the UE transceiver 410 and the base station transceiver 410 are configured to support industry standards such as the Long Term Evolution (LTE) and emerging 5G standards, and the like. It is understood, however, that the present disclosure is not necessarily limited in application to a particular standard and associated protocols. Rather, the UE transceiver 430 and the base station transceiver 410 may be configured to support alternate, or additional, wireless data communication protocols, including future standards or variations thereof.

In accordance with various embodiments, the BS 402 may be an evolved node B (eNB), a serving eNB, a target eNB, a femto station, or a pico station, for example. In some embodiments, the UE 404 may be embodied in various types of user devices such as a mobile phone, a smart phone, a personal digital assistant (PDA), tablet, laptop computer, wearable computing device, etc. The processor modules 414 and 436 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 414 and 436, respectively, or in any practical combination thereof. The memory modules 416 and 434 may be realized as RAM memory, flash memory, ROM memory, EPROM memory, EEPROM memory, registers, a hard disk, a removable disk, a CD-ROM, or any other form of storage medium known in the art. In this regard, memory modules 416 and 434 may be coupled to the processor modules 410 and 430, respectively, such that the processors modules 410 and 430 can read information from, and write information to, memory modules 416 and 434, respectively. The memory modules 416 and 434 may also be integrated into their respective processor modules 410 and 430. In some embodiments, the memory modules 416 and 434 may each include a cache memory for storing temporary variables or other intermediate information during execution of instructions to be executed by processor modules 410 and 430, respectively. Memory modules 416 and 434 may also each include non-volatile memory for storing instructions to be executed by the processor modules 410 and 430, respectively.

The network communication module 418 generally represents the hardware, software, firmware, processing logic, and/or other components of the base station 402 that enable bi-directional communication between base station transceiver 410 and other network components and communication nodes configured to communication with the base station 402. For example, network communication module 418 may be configured to support internet or WiMAX traffic. In a typical deployment, without limitation, network communication module 418 provides an 802.3 Ethernet interface such that base station transceiver 410 can communicate with a conventional Ethernet based computer network. In this manner, the network communication module 418 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Overview of a Machine Type Communication (MTC)

Machine Type Communications (MTC), also known as Machine to Machine (M2M), is the main application form of the Internet of Things at this stage. MTC devices currently deployed on the market are mainly based on Global System of Mobile communication (GSM) system. In recent years, due to the high spectral efficiency of Long Term Evolution (LTE)/LTE-A (LTE-Advanced), more and more mobile operators choose LTE/LTE-A as the future broadband The evolution direction of wireless communication systems; LTE/LTE-A-based MTC multiple data services will also be more attractive.

Figure 5:
FIG. 5 illustrates an example table of scheduling delay between MPDCCH and PDSCH, in accordance with a conventional embodiment.

In order to support the application of higher data rate MTC, the terminal (User Equipment, UE for short) needs to support new functions; half-duplex-frequency division duplex UE (HD-FDD UE) needs to support a maximum of 10 hybrid automatic retransmission requests (Hybrid Automatic Repeat Request, HARQ)-ACK (Acknowledgement) process, as shown in FIG. 5.

FIG. 5 illustrates an example table of scheduling delay between MPDCCH and PDSCH, in accordance with a conventional embodiment. In some embodiments, the scheduling delay between MPDCCH and PDSCH may be fixed at 2.

FIG. 6 illustrates an example table of HARQ-ACK delay, in accordance with a conventional embodiment.

Through the high-level signaling ce-SchedulingEnhancement configuration, which group of HARQ-ACK delay may, in some embodiments, be selected. The specific timing of the control domain ("domain" may sometimes be referred to as, "field"), in some embodiments, may controlled by the HARQ-ACK delay in the downlink control information DCI.

For the indication scheme that supports 14 HARQ processes as PDSCH scheduling delay and HARQ-ACK delay, the conventional 5G NR system provides two solutions.

In a "first solution", if the value indicated by the HARQ process ID is less than 10, the BS (e.g., BS 302 in FIG. 3) and/or UE (e.g., UE 304 in FIG. 3) determines the HARQ process number according to the existing process, HARQ-ACK delay, and PDSCH scheduling delay is fixed at 2. Otherwise, the BS 302 and/or UE 304 determines the HARQ-ACK process index and PDSCH delay according to the HARQ-ACK delay field in the DCI. For example, FIG. 7 illustrates an example table of HARQ-ACK delay, in accordance with a conventional embodiment.

Figure 8:
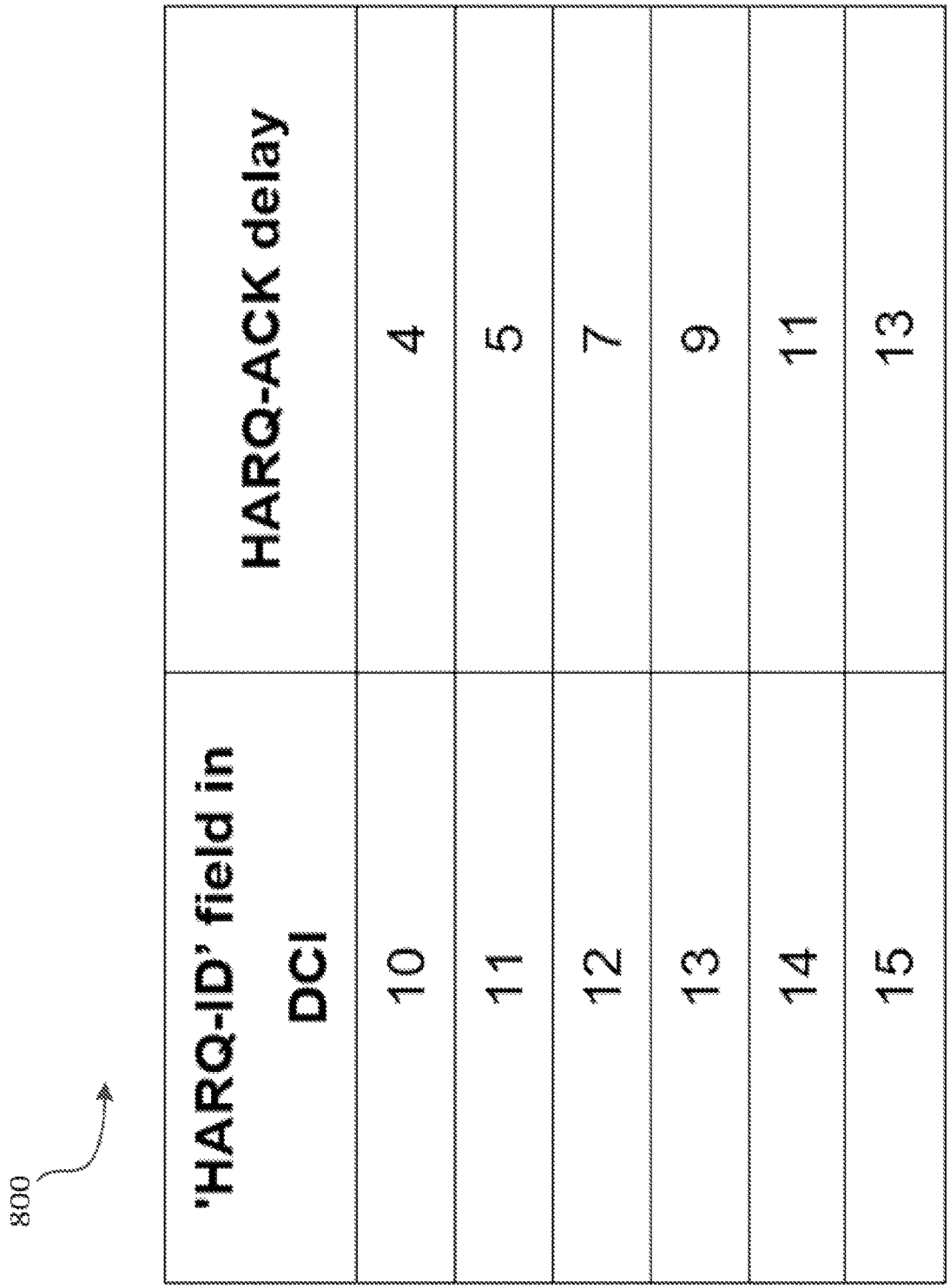
FIG. 8 illustrates an example table of feedback delay of HARQ-ACK delay, in accordance with a conventional embodiment.

The HARQ process control field in DCI is used to indicate the HARQ-ACK delay. For example, FIG. 8 illustrates an example table of feedback delay of HARQ-ACK in accordance with a conventional embodiment.

However, the solutions used by the conventional 5G NR systems have disadvantages. First, when the number of processes is different, the meaning of the HARQ process number field and the HARQ-ACK delay field is different, which increases the complexity of the UE (e.g., UE 304 in FIG. 3).

Figure 9:
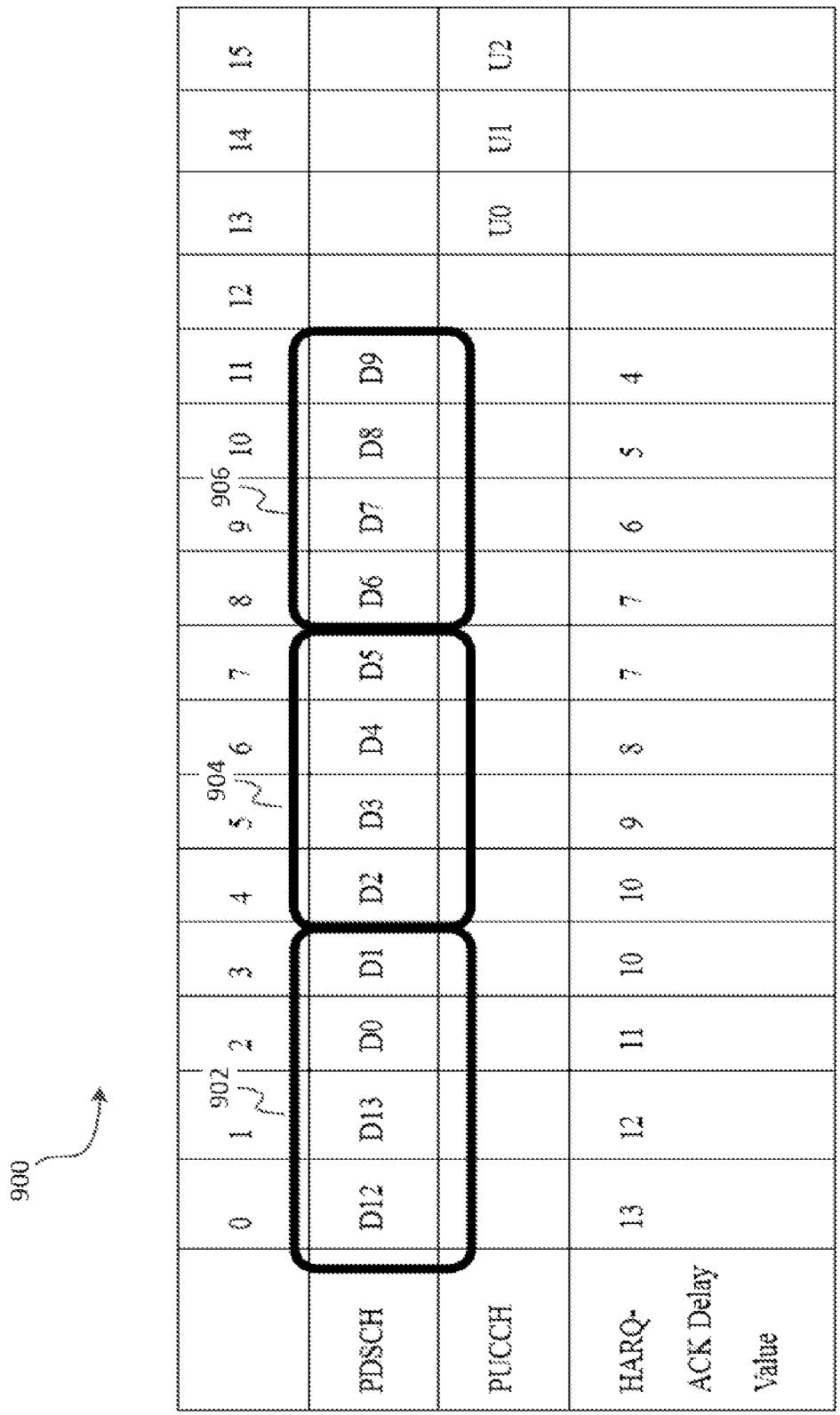
FIG. 9 illustrates an example table of HARQ-ACK feedback delay values transmitted in an uplink subframe, in accordance with an embodiment of the present disclosure.

Second, the supported HARQ-ACK delay value may be {4, 5, 7, 9, 11, 13}, not all HARQ-ACK delay values are supported, which limits the configuration of the HARQ-ACK binding window, as shown in FIG. 9.

FIG. 9 illustrates an example table of HARQ-ACK feedback delay values transmitted in an uplink subframe, in accordance with an embodiment of the present disclosure. As shown, the table 900 includes a first PDSCH group 902, a second PDSCH group 904, and a third PDSCH 906 group. The first PDSCH group 902 may be sent to U0, the second PDSCH group 904 may be sent to U1, and the third PDSCH group 906 may be sent to U2. The conventional 5G NR system, however, does not support transmitting the HARQ-ACK corresponding to the PDSCH (e.g., transmitting first PDSCH group 902 to U0, etc.) in the same subframe. As such, the binding window is restricted to a certain extent to limit the flexibility of scheduling, so that the downlink peak data rate cannot be guaranteed.

In a "second solution", the BS 302 and/or UE 304 may add 1 bit to DCI to indicate whether the PDSCH delay is 2 or 7. The value of the HARQ-ACK delay is still indicated by the HARQ-ACK delay field in the DCI. For example, FIG. 10 illustrates an example table of feedback delay of HARQ-ACK delay, in accordance with some embodiments of the present disclosure.

As shown in FIG. 9 and FIG. 10, tables 900 and 1000 do not include all HARQ-ACK feedback delay values, which results in that the binding window cannot be flexibly configured when the HARQ-ACK is bound to be transmitted, thereby failing to guarantee the downlink peak data rate.

Accordingly, in R17, the NR system needs to support HD-FDD UE. Since R17 has not been discussed yet, there is no solution provided by conventional 5G NR systems.

4. Determining Control Information

4.1 Example Embodiment(s)—Group 1

UE Perspective:

The UE 304, in some embodiments, may receive downlink control information (e.g., PDSCH scheduling delay, HARQ-ACK delay, etc.).

The UE 304, in some embodiments, may determine the PDSCH scheduling delay and/or the corresponding HARQ-ACK feedback delay according to the first control domain ("domain" may sometimes be referred to as, "field") in the downlink control information.

The UE 304, in some embodiments, may receive the PDSCH, and/or send the HARQ-ACK according to the reception of the PDSCH.

In some embodiments, the determined scheduling delay of the PDSCH (sometimes referred to as, "PDSCH scheduling delay") and HARQ-ACK delay may include at least one of the following: {PDSCH scheduling delay is 2, and HARQ-ACK delay is 4}, {PDSCH scheduling delay is 2, and HARQ-ACK delay is 5}, {PDSCH scheduling delay is 2, HARQ-ACK delay is 6}, {PDSCH scheduling delay is 2, and HARQ-ACK delay is 7}, {PDSCH scheduling delay is 2, and HARQ-ACK delay is 8}, {PDSCH scheduling delay is 2, and HARQ-ACK delay is 9}, {PDSCH scheduling delay is 2, and the HARQ-ACK delay is 10}, {PDSCH scheduling delay is 2, and HARQ-ACK delay is 11}, {PDSCH scheduling delay is 2, and HARQ-ACK delay is 13}, {PDSCH scheduling delay is 2, and HARQ-ACK delay is 15}, {PDSCH scheduling delay is 2, and HARQ-ACK delay is 17}; {PDSCH scheduling delay is 7, and HARQ-ACK delay is 12}, {PDSCH scheduling delay is 7, and HARQ-ACK delay is 13}.

In some embodiments, the first control domain may include a HARQ-ACK delay domain and/or a second control domain. In some embodiments, the size of the second control domain may be 1 bit.

In some embodiments, the second control domain is PDSCH scheduling delays domain, wherein the value of '0' for the domain means the PDSCH scheduling delay is 2 and the value of '1' for the domain means the PDSCH scheduling delay is 2 or 7, vice versa.

In some embodiments, the UE 304 may determine a PDSCH scheduling delay and/or HARQ-ACK delay according to the first control domain in the downlink control information, as shown in FIG. 11. For example, FIG. 11 illustrates an example table of HARQ-ACK delay, in accordance with some embodiments of the present disclosure.

BS Perspective:

The BS 302, in some embodiments, may send (e.g., transmit, deliver, etc.) downlink control information (e.g., PDSCH scheduling delay, HARQ-ACK feedback delay, etc.)

The BS 302, in some embodiments, may indicate (e.g., notify, identify, select, etc.) the scheduling delay of the PDSCH and/or the HARQ-ACK delay through the first control domain in the downlink control information.

The BS 302, in some embodiments, may send (e.g., transmit, deliver, etc.) the PDSCH, and/or receive the HARQ-ACK corresponding to the PDSCH.

In some embodiments, the indicated scheduling delay of the PDSCH and/or the HARQ-ACK delay may include at least one of the following: {PDSCH scheduling delay is 2, and HARQ-ACK delay is 4}, {PDSCH scheduling delay is 2, and HARQ-ACK delay is 5}, {PDSCH scheduling delay is 2, and HARQ-ACK delay is 6}, {PDSCH scheduling delay is 2, and HARQ-ACK delay is 7}, {PDSCH scheduling delay is 2, and HARQ-ACK delay is 8}, {PDSCH scheduling delay is 2, and HARQ-ACK delay is 9}, {PDSCH scheduling delay is 2, and HARQ-ACK delay is 10}, {PDSCH scheduling delay is 2, and HARQ-ACK delay is 11}, {PDSCH scheduling delay is 2, and HARQ-ACK delay is 13}, {PDSCH scheduling delay is 2, and HARQ-ACK delay is 15}, {PDSCH scheduling delay is 2, and HARQ-ACK delay is 17}; {PDSCH scheduling delay is 7, and HARQ-ACK delay is 12}, {PDSCH scheduling delay is 7, and HARQ-ACK delay is 13}.

In some embodiments, the first control domain may include a HARQ-ACK delay domain and/or a second control domain. In some embodiments, the size of the second control domain may be 1 bit.

In some embodiments, the second control domain is PDSCH scheduling delays domain, wherein the value of '0' for the domain means the PDSCH scheduling delay is 2 and the value of '1' for the domain means the PDSCH scheduling delay is 2 or 7.

In some embodiments, the BS 302 may indicate the scheduling delay of the PDSCH and/or the feedback delay of the corresponding HARQ-ACK through the first control domain in the downlink control information, as shown in FIG. 11.

4.2 Example Embodiment(s)—Group 2

UE Perspective:

The UE 304, in some embodiments, may receive downlink control information (e.g., PDSCH scheduling delay, HARQ-ACK delay, etc.).

The UE 304, in some embodiments, may determine (e.g., calculate, measure, identify, etc.) the PDSCH scheduling delay and/or HARQ-ACK delay according to the first control domain in the downlink control information.

The UE 304, in some embodiments, may receive the PDSCH, and/or send the HARQ-ACK according to the reception of the PDSCH.

In some embodiments, the determined scheduling delay of the PDSCH and/or the HARQ-ACK delay may include at least one of the following: {PDSCH scheduling delay is 2, and HARQ-ACK delay is 4}, {PDSCH scheduling delay is 2, and HARQ-ACK delay is 5}, {PDSCH scheduling delay is 2, and HARQ-ACK delay is 6}, {PDSCH scheduling delay is 2, and HARQ-ACK delay is 7}, {PDSCH scheduling delay is 2, and HARQ-ACK delay is 8}, {PDSCH scheduling delay is 2, and HARQ-ACK delay is 9}, {PDSCH scheduling delay is 2, and HARQ-ACK delay is 10}, {PDSCH scheduling delay is 2, and HARQ-ACK delay is 11}, {PDSCH scheduling delay is 2, and HARQ-ACK delay is 13}, {PDSCH scheduling delay is 2, and HARQ-ACK delay is 15}, {PDSCH scheduling delay is 2, and HARQ-ACK delay is 17}; {PDSCH scheduling delay is 7, and HARQ-ACK delay is 12}, {PDSCH scheduling delay is 7, and HARQ-ACK delay is 13}.

Figure 12:
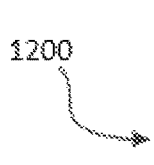
FIG. 12 illustrates an example table of feedback delay of HARQ-ACK delay, in accordance with some embodiments of the present disclosure.

In some embodiments, the first control domain may be a HARQ-ACK delay domain. In some embodiments, the UE 304 may determine a PDSCH scheduling delay and/or a HARQ-ACK delay according to the first control domain in the downlink control information, as shown in FIG. 12. For example, FIG. 12 illustrates an example table of HARQ-ACK delay, in accordance with some embodiments of the present disclosure.

BS Perspective:

The BS 302, in some embodiments, may send downlink control information (e.g., PDSCH scheduling delay, HARQ-ACK delay, etc.).

The BS 302, in some embodiments, may indicate the PDSCH scheduling delay and/or the HARQ-ACK delay through the first control domain in the downlink control information.

The BS 302, in some embodiments, may send the PDSCH, and/or the BS 302 may receive the HARQ-ACK corresponding to the PDSCH.

In some embodiments, the indicated scheduling delay of the PDSCH and/or the HARQ-ACK delay may include at least one of the following: {PDSCH scheduling delay is 2, and HARQ-ACK delay is 4}, {PDSCH scheduling delay is 2, and HARQ-ACK delay is 5}, {PDSCH scheduling delay is 2, and HARQ-ACK delay is 6}, {PDSCH scheduling delay is 2, and HARQ-ACK delay is 7}, {PDSCH scheduling delay is 2, and HARQ-ACK delay is 8}, {PDSCH scheduling delay is 2, and HARQ-ACK delay is 9}, {PDSCH scheduling delay is 2, and HARQ-ACK delay is 10}, {PDSCH scheduling delay is 2, and HARQ-ACK delay is 11}, {PDSCH scheduling delay is 2, and HARQ-ACK delay is 13}, {PDSCH scheduling delay is 2, and HARQ-ACK delay is 15}, {PDSCH scheduling delay is 2, and HARQ-ACK delay is 17}; {PDSCH scheduling delay is 7, and HARQ-ACK delay is 12}, {PDSCH scheduling delay is 7, and HARQ-ACK delay is 13}.

In some embodiments, the first control domain may be a HARQ-ACK delay domain.

In some embodiments, the BS 302 may indicate the scheduling delay of the PDSCH and/or the HARQ-ACK delay through the first control domain in the downlink control information, as shown in FIG. 12.

4.3 Example Embodiment(s)—Group 3

UE Perspective:

The UE 304, in some embodiments, may receive downlink control information (e.g., PDSCH scheduling delay, HARQ-ACK delay, etc.).

The UE 304, in some embodiments, may determine the HARQ process number, the PDSCH scheduling delay, and/or the HARQ-ACK delay according to the first control domain in the downlink control information.

The UE 304, in some embodiments, may receive the PDSCH, and/or send the HARQ-ACK according to the reception of the PDSCH.

In some embodiments, the determined HARQ process number, the PDSCH scheduling delay, and/or the corresponding HARQ-ACK feedback delay include at least one of the following: {HARQ process number is 10, PDSCH scheduling delay is 2, and HARQ-ACK delay is 4}, {HARQ process number is 10, PDSCH scheduling delay is 2, HARQ-ACK delay is 5}, {HARQ process number is 10, PDSCH scheduling delay is 2, HARQ-ACK delay is 6}, {HARQ process number is 10, PDSCH scheduling delay is 2, and HARQ-ACK delay is 7}, {HARQ process number is 10, the PDSCH scheduling delay is 2, and HARQ-ACK delay is 8}, {HARQ process number is 10, the PDSCH scheduling delay is 2, and HARQ-ACK delay is 9}, {HARQ process number is 10, the PDSCH scheduling delay is 2, and HARQ-ACK delay is 10}, {HARQ process number is 10, the PDSCH scheduling delay is 2, and HARQ-ACK delay is 11}, {HARQ process number is 10, PDSCH The scheduling delay is 7, and HARQ-ACK delay is 12}, {HARQ process number is 10, the scheduling delay of PDSCH is 7, and HARQ-ACK delay is 13}, {HARQ process number is 10, PDSCH scheduling delay is 7, and HARQ-ACK delay is 14}, {HARQ process number is 10, PDSCH scheduling delay is 7, and HARQ-ACK delay is 15}, {HARQ process number is 11, PDSCH scheduling delay is 2, and HARQ-ACK delay is 4}, {HARQ process number is 11, PDSCH scheduling delay is 2, and HARQ-ACK delay is 5}, {HARQ process number is 11, PDSCH scheduling delay is 2, and HARQ-ACK delay is 6}, {HARQ process number is 11, PDSCH scheduling delay is 2, and HARQ-ACK delay is 7}, {HARQ process number is 11, the PDSCH scheduling delay is 2, and HARQ-ACK delay is 8}, {HARQ process number is 11, the PDSCH scheduling delay is 2, and HARQ-ACK delay is 9}, {HARQ process number is 11, the PDSCH scheduling delay is 2, and HARQ-ACK delay is 10}, {HARQ process number is 11, the PDSCH scheduling delay is 2, and HARQ-ACK delay is 11}, {HARQ process number is 11, the PDSCH scheduling delay is 7, and HARQ-ACK delay is 12}, {HARQ process number is 11, the PDSCH scheduling delay is 7, and HARQ-ACK delay is 13}, {HARQ process number is 11, the PDSCH scheduling delay is 7, and HARQ-ACK delay is 14}, {HARQ process number is 11, the PDSCH scheduling delay is 7, and HARQ-ACK delay is 15}, {HARQ process number is 12, the PDSCH scheduling delay is 2, and HARQ-ACK delay is 4}, {HARQ process number is 12, the PDSCH scheduling delay is 2, and HARQ-ACK delay is 5}, {HARQ process number is 12, the PDSCH scheduling delay is 2, and HARQ-ACK delay is 6}, {HARQ process number is 12, the PDSCH scheduling delay is 2, and HARQ-ACK delay is 7}, {HARQ process number is 12, the PDSCH scheduling delay is 2, and HARQ-ACK delay is 8}, {HARQ process number is 12, the PDSCH scheduling delay is 2, and HARQ-ACK delay is 9}, {HARQ process number is 12, the PDSCH scheduling delay is 2, and HARQ-ACK delay is 10}, {HARQ process number is 12, the PDSCH scheduling delay is 2, and HARQ-ACK delay is 11}, {HARQ process number is 12, the PDSCH scheduling delay is 7, and HARQ-ACK delay is 12}, {HARQ process number is 12, the PDSCH scheduling delay is 7, and HARQ-ACK delay is 13}, {HARQ process number is 12, the PDSCH scheduling delay is 7, and HARQ-ACK delay is 14}, {HARQ process number is 12, the PDSCH scheduling delay is 7, and HARQ-ACK delay is 15}, {HARQ process number is 13, the PDSCH scheduling delay is 2, and HARQ-ACK delay is 4}, {HARQ process number is 13, the PDSCH scheduling delay is 2, and HARQ-ACK delay is 5}, {HARQ process number is 13, the PDSCH scheduling delay is 2, and HARQ-ACK delay is 6}, {HARQ process number is 13, the PDSCH scheduling delay is 2, and HARQ-ACK delay is 7}, {HARQ process number is 13, the PDSCH scheduling delay is 2, and HARQ-ACK delay is 8}, {HARQ process number is 13, the PDSCH scheduling delay is 2, and HARQ-ACK delay is 9}, {HARQ process number is 13, the PDSCH scheduling delay is 2, and HARQ-ACK delay is 10}, {HARQ process number is 13, the PDSCH scheduling delay is 2, and HARQ-ACK delay is 11}, {HARQ process number is 13, the PDSCH scheduling delay is 7, and HARQ-ACK delay is 12}, {HARQ process number is 13, the PDSCH scheduling delay is 7, and HARQ-ACK delay is 13}, {HARQ process number is 13, the PDSCH scheduling delay is 7, and HARQ-ACK delay is 14}, {HARQ process number is 13, the PDSCH scheduling delay is 7, and HARQ-ACK delay is 15}.

In some embodiments, the first control domain may include a HARQ process number domain and/or a HARQ-ACK delay domain.

In some embodiments, the UE 304 may determine a PDSCH scheduling delay and/or HARQ-ACK delay according to the first control domain in the downlink control information, as shown in FIG. 13. For example, FIG. 13 illustrates an example table of HARQ-ACK delay, in accordance with some embodiments of the present disclosure.

BS Perspective:

The BS 302, in some embodiments, may send downlink control information (e.g., PDSCH scheduling delay, HARQ-ACK feedback delay, etc.).

The BS 302, in some embodiments, may indicate the HARQ process number, the PDSCH scheduling delay, and the corresponding HARQ-ACK feedback delay through the first control domain in the downlink control information.

The BS 302, in some embodiments, may send the PDSCH, and/or the BS 302 receives the HARQ-ACK corresponding to the PDSCH.

In some embodiments, the indicated HARQ process number, PDSCH scheduling delay and/or the HARQ-ACK delay may include at least one of the following: {HARQ process number is 10, PDSCH scheduling delay is 2, and HARQ-ACK delay is 4}, {HARQ process number is 10, PDSCH scheduling delay is 2, HARQ-ACK delay is 5}, {HARQ process number is 10, PDSCH scheduling delay is 2, HARQ-ACK delay is 6}, {HARQ process number is 10, PDSCH scheduling delay is 2, and HARQ-ACK delay is 7}, {HARQ process number is 10, the PDSCH scheduling delay is 2, and HARQ-ACK delay is 8}, {HARQ process number is 10, the PDSCH scheduling delay is 2, and HARQ-ACK delay is 9}, {HARQ process number is 10, the PDSCH scheduling delay is 2, and HARQ-ACK delay is 10}, {HARQ process number is 10, the PDSCH scheduling delay is 2, and HARQ-ACK delay is 11}, {HARQ process number is 10, PDSCH The scheduling delay is 7, and HARQ-ACK delay is 12}, {HARQ process number is 10, the scheduling delay of PDSCH is 7, and HARQ-ACK delay is 13}, {HARQ process number is 10, PDSCH scheduling delay is 7, and HARQ-ACK delay is 14}, {HARQ process number is 10, PDSCH scheduling delay is 7, and HARQ-ACK delay is 15}, {HARQ process number is 11, PDSCH scheduling delay is 2, and HARQ-ACK delay is 4}, {HARQ process number is 11, PDSCH scheduling delay is 2, and HARQ-ACK delay is 5}, {HARQ process number is 11, PDSCH scheduling delay is 2, and HARQ-ACK delay is 6}, {HARQ process number is 11, PDSCH scheduling delay is 2, and HARQ-ACK delay is 7}, {HARQ process number is 11, the PDSCH scheduling delay is 2, and HARQ-ACK delay is 8}, {HARQ process number is 11, the PDSCH scheduling delay is 2, and HARQ-ACK delay is 9}, {HARQ process number is 11, the PDSCH scheduling delay is 2, and HARQ-ACK delay is 10}, {HARQ process number is 11, the PDSCH scheduling delay is 2, and HARQ-ACK delay is 11}, {HARQ process number is 11, the PDSCH scheduling delay is 7, and HARQ-ACK delay is 12}, {HARQ process number is 11, the PDSCH scheduling delay is 7, and HARQ-ACK delay is 13}, {HARQ process number is 11, the PDSCH scheduling delay is 7, and HARQ-ACK delay is 14}, {HARQ process number is 11, the PDSCH scheduling delay is 7, and HARQ-ACK delay is 15}, {HARQ process number is 12, the PDSCH scheduling delay is 2, and HARQ-ACK delay is 4}, {HARQ process number is 12, the PDSCH scheduling delay is 2, and HARQ-ACK delay is 5}, {HARQ process number is 12, the PDSCH scheduling delay is 2, and HARQ-ACK delay is 6}, {HARQ process number is 12, the PDSCH scheduling delay is 2, and HARQ-ACK delay is 7}, {HARQ process number is 12, the PDSCH scheduling delay is 2, and HARQ-ACK delay is 8}, {HARQ process number is 12, the PDSCH scheduling delay is 2, and HARQ-ACK delay is 9}, {HARQ process number is 12, the PDSCH scheduling delay is 2, and HARQ-ACK delay is 10}, {HARQ process number is 12, the PDSCH scheduling delay is 2, and HARQ-ACK delay is 11}, {HARQ process number is 12, the PDSCH scheduling delay is 7, and HARQ-ACK delay is 12}, {HARQ process number is 12, the PDSCH scheduling delay is 7, and HARQ-ACK delay is 13}, {HARQ process number is 12, the PDSCH scheduling delay is 7, and HARQ-ACK delay is 14}, {HARQ process number is 12, the PDSCH scheduling delay is 7, and HARQ-ACK delay is 15}, {HARQ process number is 13, the PDSCH scheduling delay is 2, and HARQ-ACK delay is 4}, {HARQ process number is 13, the PDSCH scheduling delay is 2, and HARQ-ACK delay is 5}, {HARQ process number is 13, the PDSCH scheduling delay is 2, and HARQ-ACK delay is 6}, {HARQ process number is 13, the PDSCH scheduling delay is 2, and HARQ-ACK delay is 7}, {HARQ process number is 13, the PDSCH scheduling delay is 2, and HARQ-ACK delay is 8}, {HARQ process number is 13, the PDSCH scheduling delay is 2, and HARQ-ACK delay is 9}, {HARQ process number is 13, the PDSCH scheduling delay is 2, and HARQ-ACK delay is 10}, {HARQ process number is 13, the PDSCH scheduling delay is 2, and HARQ-ACK delay is 11}, {HARQ process number is 13, the PDSCH scheduling delay is 7, and HARQ-ACK delay is 12}, {HARQ process number is 13, the PDSCH scheduling delay is 7, and HARQ-ACK delay is 13}, {HARQ process number is 13, the PDSCH scheduling delay is 7, and HARQ-ACK delay is 14}, {HARQ process number is 13, the PDSCH scheduling delay is 7, and HARQ-ACK delay is 15}.

In some embodiments, the first control domain may be composed of a HARQ process number domain and/or a HARQ-ACK delay domain.

In some embodiments, the BS 302 may indicate the scheduling delay of the PDSCH and/or the HARQ-ACK delay through the first control domain in the downlink control information, as shown in FIG. 13.

4.4 Example Embodiment(s)—Group 4

UE Perspective:

The UE 304, in some embodiments, may receive downlink control information.

The UE 304, in some embodiments, may determine the HARQ-ACK delay according to the first control domain in the downlink control information.

The UE 304, in some embodiments, may receive the PDSCH, and/or send HARQ-ACK according to the reception of the PDSCH.

In some embodiments, the HARQ-ACK feedback delay domain may include a delay value of {0, 1, 2, . . . 15}.

In some embodiments, the first control domain may be a HARQ-ACK delay domain.

BS Perspective:

The BS 302, in some embodiments, may send downlink control information (e.g., PDSCH scheduling delay, HARQ-ACK delay, etc.).

The BS 302, in some embodiments, may indicate the HARQ-ACK feedback delay through the first control domain in the downlink control information.

The BS 302, in some embodiments, may send the PDSCH, and/or receive the HARQ-ACK corresponding to the PDSCH.

In some embodiments, the HARQ-ACK delay domain may include a delay value of {0, 1, 2, . . . 15}.

In some embodiments, the first control domain may be a HARQ-ACK delay domain.

4.5 Example Embodiment(s)—Group 5

UE Perspective:

The UE 304, in some embodiments, may receive downlink control information;

The UE 304, in some embodiments, may determine the HARQ-ACK delay according to the first control domain in the downlink control information.

The UE 304, in some embodiments, may receive the PDSCH, and sends HARQ-ACK according to the reception of the PDSCH.

In some embodiments, the HARQ-ACK delay domain may contain a delay value of {0, 1, 2, . . . 15}.

In some embodiments, the first control domain may include a 3-bit HARQ-ACK delay domain and/or a 1-bit third control domain.

BS Perspective:

The BS 302, in some embodiments, may send downlink control information.

The BS 302, in some embodiments, may indicate the HARQ-ACK delay through the first control domain in the downlink control information.

The BS 302, in some embodiments, may send the PDSCH, and/or receive the HARQ-ACK corresponding to the PDSCH.

In some embodiments, the HARQ-ACK delay domain includes a delay value of {0, 1, 2, . . . 15}.

In some embodiments, the first control domain may include a 3-bit HARQ-ACK delay domain and/or a 1-bit third control domain.

4.6 Example Embodiment(s)—Group 6

UE Perspective:

The UE 304, in some embodiments, may receive downlink control information;

The UE 304, in some embodiments, may determine the HARQ-ACK delay according to the first control domain in the downlink control information.

The UE 304, in some embodiments, may receive the PDSCH, and/or send the HARQ-ACK according to the reception of the PDSCH.

In some embodiments, the delay value contained in the HARQ-ACK delay field may be a maximum of 16 values configured by high-level signaling;

In some embodiments, the first control domain may be at most 4 bits.

BS Perspective:

The BS 302, in some embodiments, may send downlink control information.

The BS 302, in some embodiments, may indicate the HARQ-ACK delay through the first control domain in the downlink control information.

The BS 302, in some embodiments, may send the PDSCH, and/or receive the HARQ-ACK corresponding to the PDSCH.

In some embodiments, the delay value contained in the HARQ-ACK delay field may be a maximum of 16 values configured by high-level signaling.

In some embodiments, the first control domain may be at most 4 bits.

4.7 Example Embodiment(s)—Group 7

UE Perspective:

The UE 304, in some embodiments, may receive downlink control information.

The UE 304, in some embodiments, may determine the HARQ-ACK delay according to the first control domain in the downlink control information.

The UE 304, in some embodiments, may receive the PDSCH, and/or send the HARQ-ACK according to the reception of the PDSCH.

In some embodiments, when the corresponding PDSCH slot belongs to the first time slot, the value of the HARQ-ACK delay is selected from one of a first value set. In some embodiments, when the time slot in which the corresponding PDSCH is located belongs to the second time slot, the value of the HARQ-ACK delay is selected from one of a second value set.

In some embodiments, the first time slot may be a time slot whose time slot index is an odd number. In some embodiments, the first time slot may be a time slot whose time slot index is less than or equal to a preset value. In some embodiments, the first time slot may be a time slot whose wireless frame index is an odd number. In some embodiments, the first time slot may be a predefined slot.

In some embodiments, the second time slot may be a time slot whose time slot index is an even number. In some embodiments, the second time slot may be a time slot whose time slot index is greater than a preset value. In some embodiments, the second time slot may be a time slot whose wireless frame index is an even number. In some embodiments, the second time slot may be a predefined slot.

In some embodiments, the first control domain may be a HARQ-ACK delay domain.

BS Perspective:

The BS 302, in some embodiments, may send downlink control information.

The BS 302, in some embodiments, may indicate the HARQ-ACK delay through the first control domain in the downlink control information.

The BS 302, in some embodiments, may send the PDSCH, and/or receive the HARQ-ACK corresponding to the PDSCH.

In some embodiments, when the corresponding PDSCH slot belongs to the first time slot, the value of the HARQ-ACK delay is selected from one of a first value set. In some embodiments, when the time slot in which the corresponding PDSCH is located belongs to the second time slot, the value of the HARQ-ACK delay is selected from one of a second value set.

In some embodiments, t time slot may be a time slot whose time slot index is an odd number. In some embodiments, the first time slot may be a time slot whose time slot index is less than or equal to a preset value. In some embodiments, the first time slot may be a radio whose wireless frame index is an odd number. In some embodiments, the second time slot may be a predefined slot.

In some embodiments, the second time slot may be a time slot whose time slot index is an even number. In some embodiments, the second time slot may be a time slot whose time slot index is greater than a preset value. In some embodiments, the second time slot may be a time slot whose wireless frame index is an even number. In some embodiments, the second time slot may be a predefined slot.

In some embodiments, the first control domain may be a HARQ-ACK delay domain.

4.8 Example Embodiment(s)—Group 8

UE Perspective:

The UE 304, in some embodiments, may receive downlink control information.

The UE 304, in some embodiments, may determine the HARQ-ACK delay according to the first control domain in the downlink control information.

The UE 304, in some embodiments, may receive the PDSCH, and/or send the HARQ-ACK according to the reception of the PDSCH.

In some embodiments, when the HARQ process corresponding to the PDSCH belongs to the first process, the value of the HARQ-ACK delay is selected from one of a first value set. In some embodiments, when the HARQ process corresponding to the PDSCH belongs to the second process, the value of the HARQ-ACK delay is selected from one of a second value set.

In some embodiments, the first process may be a process whose HARQ process number is an odd number. In some embodiments, the first process may be a process whose HARQ process number is less than a preset value. In some embodiments, the first process may be a predefined process.

In some embodiments, the second process may be a process whose HARQ process number is an even number. In some embodiments, the second process may be a process whose HARQ process is greater than a preset value. In some embodiments, the second process may be a predefined process.

In some embodiments, the first control domain may be a HARQ-ACK feedback delay domain.

BS Perspective:

The BS 302, in some embodiments, may send downlink control information.

The BS 302, in some embodiments, may indicate the HARQ-ACK feedback delay through the first control domain in the downlink control information.

The BS 302, in some embodiments, may send the PDSCH, and/or receive the HARQ-ACK corresponding to the PDSCH.

In some embodiments, when the HARQ process corresponding to the PDSCH belongs to the first process, the value of the HARQ-ACK delay is selected from one of a first value set. In some embodiments, when the HARQ process corresponding to the PDSCH belongs to the second process, the value of the HARQ-ACK delay is selected from one of a second value set.

In some embodiments, the first process may be a process whose HARQ process number is an odd number. In some embodiments, the first process may be a process whose HARQ process number is less than a preset value. In some embodiments, the second process may be a predefined process.

In some embodiments, the second process may be a process whose HARQ process number is an even number. In some embodiments, the second process may be a process whose HARQ process is greater than a preset value. In some embodiments, the second process may be a predefined process.

In some embodiments, the first control domain may be a HARQ-ACK feedback delay domain.

4.9 Example Embodiment(s)—Group 9

UE Perspective:

The UE 304, in some embodiments, may receive downlink control information.

The UE 304, in some embodiments, may determine the HARQ-ACK feedback delay according to the first control domain in the downlink control information.

The UE 304, in some embodiments, may receive the PDSCH, and/or send HARQ-ACK according to the reception of the PDSCH.

In some embodiments, when the control resource group where the downlink control information belongs to the first control resource group, the value of the HARQ-ACK delay is selected from one of a first value set. In some embodiments, when the control resource group where the downlink control information belongs to a second control resource group, the value of the HARQ-ACK delay is selected from one of a second value set.

In some embodiments, the first control resource group may be an odd control resource group. In some embodiments, the first control resource group may be a predefined control resource group.

In some embodiments, the second control resource group may be a control resource group with an even index. In some embodiments, the first control resource group may be a predefined control resource group.

In some embodiments, the first control domain may be a HARQ-ACK feedback delay domain.

BS Perspective:

The BS 302, in some embodiments, may receive downlink control information.

The BS 302, in some embodiments, may indicate the HARQ-ACK feedback delay through the first control domain in the downlink control information;

The BS 302, in some embodiments, may send the PDSCH, and/or receive the HARQ-ACK corresponding to the PDSCH.

In some embodiments, when the control resource group where the downlink control information belongs to the first control resource group, the value of the HARQ-ACK delay is selected from one of a first value set. In some embodiments, when the control resource group where the downlink control information belongs to a second control resource group, the value of the HARQ-ACK delay is selected from one of a second value set.

In some embodiments, the first control resource group may be an odd control resource group. In some embodiments, the first control resource group may be a predefined control resource group.

In some embodiments, the second control resource group may be a control resource group with an even index. In some embodiments, the first control resource group may be a predefined control resource group.

In some embodiments, the first control domain may be a HARQ-ACK feedback delay domain.

5. Methods for Implementing Example Embodiment(s) from Groups 1-9

FIG. 14 is a flow diagram depicting a method for determining downlink control information, in accordance with some embodiments of the present disclosure. Additional, fewer, or different operations may be performed in the method depending on the particular embodiment. In some embodiments, some or all operations of method 1400 may be performed by a wireless communication node, such as BS 302 in FIG. 3. In some operations, some or all operations of method 1400 may be performed by a wireless communication device, such as UE 304 in FIG. 3. Each operation may be re-ordered, added, removed, or repeated.

As shown, the method 1400 includes, in some embodiments, the operation 1402 of receiving, by a wireless communication device (e.g., UE 304 in FIG. 3) from a wireless communication node (e.g., BS 302 in FIG. 3), a control signal indicating one of a plurality of physical downlink shared channel (PDSCH) scheduling delays and one of a plurality of hybrid automatic repeat request-acknowledgement (HARQ-ACK) delays. The method includes, in some embodiments, the operation of 1404 receiving, by the wireless communication device from the wireless communication node, based on the PDSCH scheduling delay, a PDSCH. The method includes, in some embodiments, the operation 1406 of transmitting, by the wireless communication device to the wireless communication node, based on the HARQ-ACK delay, a HARQ-ACK that corresponds to the received PDSCH.

FIG. 15 is a flow diagram depicting a method for determining downlink control information, in accordance with some embodiments of the present disclosure. Additional, fewer, or different operations may be performed in the method depending on the particular embodiment. In some embodiments, some or all operations of method 1500 may be performed by a wireless communication node, such as BS 302 in FIG. 3. In some operations, some or all operations of method 1500 may be performed by a wireless communication device, such as UE 304 in FIG. 3. Each operation may be re-ordered, added, removed, or repeated.

As shown, the method 1500 includes, in some embodiments, the operation 1502 of receiving, by a wireless communication device from a wireless communication node, a control signal indicating one of a plurality of hybrid automatic repeat request (HARQ) process numbers, one of a plurality of physical downlink shared channel (PDSCH) scheduling delays, and one of a plurality of hybrid automatic repeat request-acknowledgement (HARQ-ACK) delays. The method includes, in some embodiments, the operation of 1504 receiving, by the wireless communication device from the wireless communication node, based on the PDSCH scheduling delay, a PDSCH. The method includes, in some embodiments, the operation 1506 of transmitting, by the wireless communication device to the wireless communication node, based on the HARQ-ACK delay, a HARQ-ACK that corresponds to the PDSCH.

Figure 16:
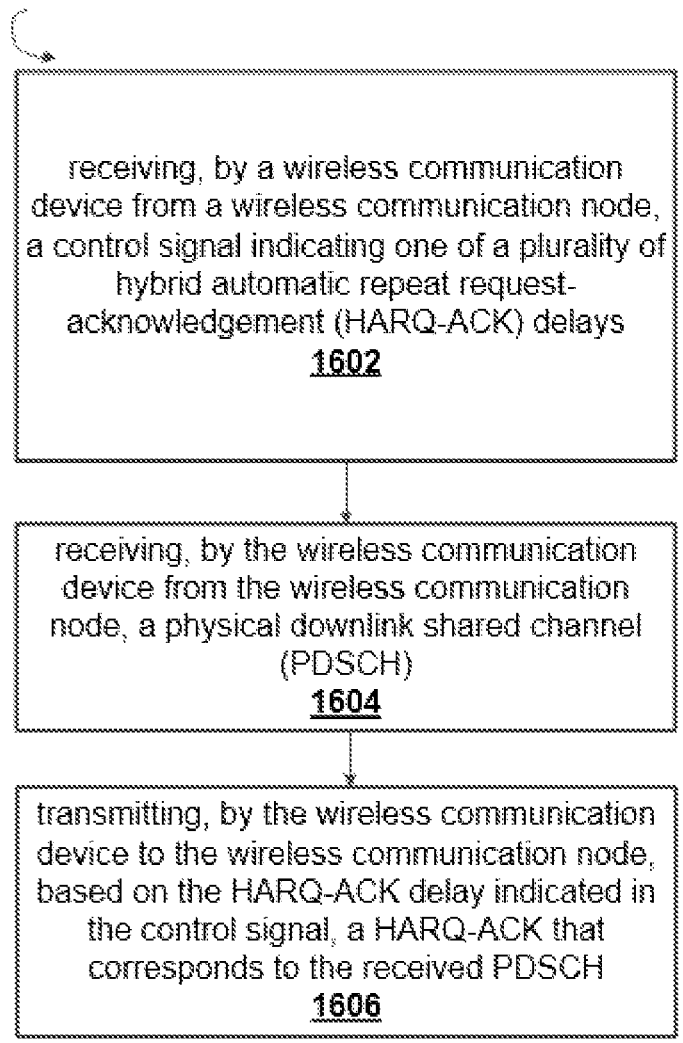
FIG. 16 is a flow diagram depicting a method for determining downlink control information, in accordance with some embodiments of the present disclosure.

FIG. 16 is a flow diagram depicting a method for determining downlink control information, in accordance with some embodiments of the present disclosure. Additional, fewer, or different operations may be performed in the method depending on the particular embodiment. In some embodiments, some or all operations of method 1600 may be performed by a wireless communication node, such as BS 302 in FIG. 3. In some operations, some or all operations of method 1600 may be performed by a wireless communication device, such as UE 304 in FIG. 3. Each operation may be re-ordered, added, removed, or repeated.

As shown, the method 1600 includes, in some embodiments, the operation 1602 of receiving, by a wireless communication device from a wireless communication node, a control signal indicating one of a plurality of hybrid automatic repeat request-acknowledgement (HARQ-ACK) delays. The method includes, in some embodiments, the operation of 1604 of receiving, by the wireless communication device from the wireless communication node, a physical downlink shared channel (PDSCH). The method includes, in some embodiments, the operation of 1606 of transmitting, by the wireless communication device to the wireless communication node, based on the HARQ-ACK delay indicated in the control signal, a HARQ-ACK that corresponds to the received PDSCH.

FIG. 17 is a flow diagram depicting a method for determining downlink control information, in accordance with some embodiments of the present disclosure. Additional, fewer, or different operations may be performed in the method depending on the particular embodiment. In some embodiments, some or all operations of method 1700 may be performed by a wireless communication node, such as BS 302 in FIG. 3. In some operations, some or all operations of method 1700 may be performed by a wireless communication device, such as UE 304 in FIG. 3. Each operation may be re-ordered, added, removed, or repeated.

As shown, the method 1700 includes, in some embodiments, the operation 1702 of transmitting, by a wireless communication node to a wireless communication device, a control signal indicating one of a plurality of physical downlink shared channel (PDSCH) scheduling delays and one of a plurality of hybrid automatic repeat request-acknowledgement (HARQ-ACK) delays. The method includes, in some embodiments, the operation of 1704 of transmitting, by the wireless communication node to the wireless communication device, a PDSCH. In some embodiments, the PDSCH causes the wireless communication device to: receive the PDSCH based on the PDSCH scheduling delay and transmit a HARQ-ACK that corresponds to the received PDSCH to the wireless communication node based on the HARQ-ACK delay. The method includes, in some embodiments, the operation of 1706 of receiving, by the wireless communication node from the wireless communication device, the HARQ-ACK that corresponds to the received PDSCH.

Figure 18:
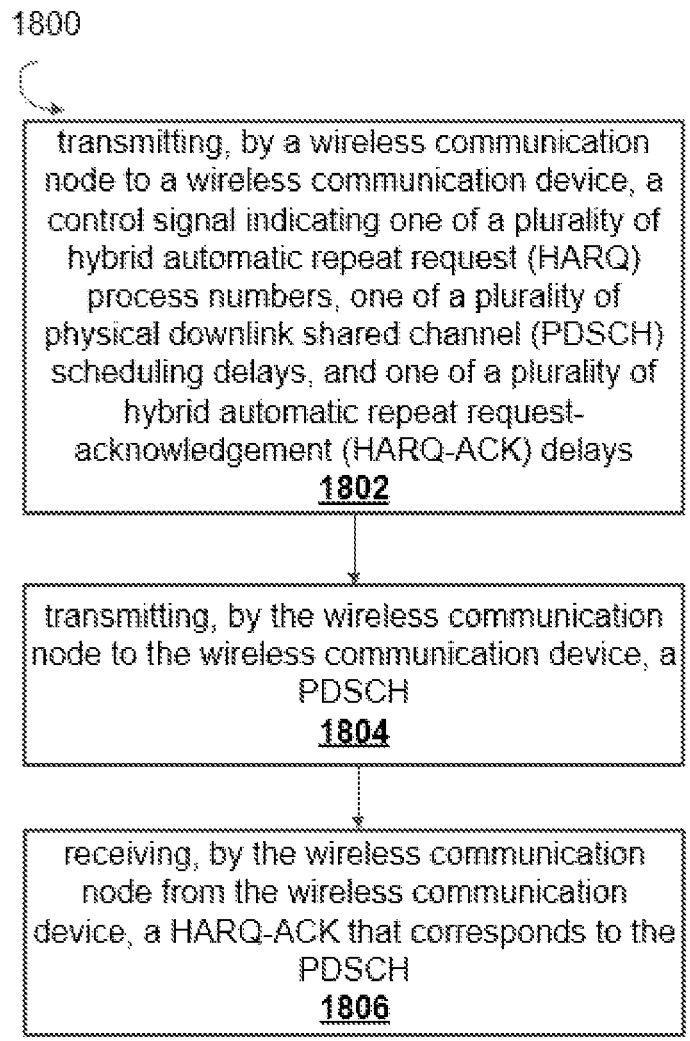
FIG. 18 is a flow diagram depicting a method for determining downlink control information, in accordance with some embodiments of the present disclosure.

FIG. 18 is a flow diagram depicting a method for determining downlink control information, in accordance with some embodiments of the present disclosure. Additional, fewer, or different operations may be performed in the method depending on the particular embodiment. In some embodiments, some or all operations of method 1800 may be performed by a wireless communication node, such as BS 302 in FIG. 3. In some operations, some or all operations of method 1800 may be performed by a wireless communication device, such as UE 304 in FIG. 3. Each operation may be re-ordered, added, removed, or repeated.

As shown, the method 1800 includes, in some embodiments, the operation 1802 of transmitting, by a wireless communication node to a wireless communication device, a control signal indicating one of a plurality of hybrid automatic repeat request (HARQ) process numbers, one of a plurality of physical downlink shared channel (PDSCH) scheduling delays, and one of a plurality of hybrid automatic repeat request-acknowledgement (HARQ-ACK) delays. The method includes, in some embodiments, the operation of 1804 of transmitting, by the wireless communication node to the wireless communication device, a PDSCH. In some embodiments, the PDSCH causes the wireless communication device to: receive the PDSCH based on the PDSCH scheduling delay and transmit a HARQ-ACK that corresponds to the PDSCH to the wireless communication node based on the HARQ-ACK delay. The method includes, in some embodiments, the operation of 1806 of receiving, by the wireless communication node from the wireless communication device, the HARQ-ACK that corresponds to the PDSCH.

FIG. 19 is a flow diagram depicting a method for determining downlink control information, in accordance with some embodiments of the present disclosure. Additional, fewer, or different operations may be performed in the method depending on the particular embodiment. In some embodiments, some or all operations of method 1900 may be performed by a wireless communication node, such as BS 302 in FIG. 3. In some operations, some or all operations of method 1900 may be performed by a wireless communication device, such as UE 304 in FIG. 3. Each operation may be re-ordered, added, removed, or repeated.

As shown, the method 1900 includes, in some embodiments, the operation 1902 of transmitting, by a wireless communication node to a wireless communication device, a control signal indicating one of a plurality of hybrid automatic repeat request-acknowledgement (HARQ-ACK) delays. The method includes, in some embodiments, the operation of 1904 of transmitting, by the wireless communication node to the wireless communication device, a physical downlink shared channel (PDSCH). In some embodiments, the PDSCH causes the wireless communication device to: receive the PDSCH based on the HARQ-ACK delay indicated in the control signal and transmit a HARQ-ACK that corresponds to the received PDSCH. The method includes, in some embodiments, the operation of 1906 of receiving, by the wireless communication node to the wireless communication device, the HARQ-ACK that corresponds to the received PDSCH.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
receiving, by a wireless communication device from a wireless communication node, a control signal indicating one of a plurality of physical downlink shared channel (PDSCH) scheduling delays and one of a plurality of hybrid automatic repeat request-acknowledgement (HARQ-ACK) delays, wherein the control signal includes 4 bits configured to indicate: (i) the PDSCH scheduling delay and (ii) the HARQ-ACK delay, wherein the control signal is configured to indicate a combination of the PDSCH scheduling delay and the HARQ-ACK delay, and wherein the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13};
receiving, by the wireless communication device from the wireless communication node, based on the PDSCH scheduling delay, a PDSCH; and
transmitting, by the wireless communication device to the wireless communication node, based on the HARQ-ACK delay, a HARQ-ACK that corresponds to the received PDSCH.

2. The wireless communication method of claim 1, wherein the control signal includes a first field and a second field configured to collectively indicate the combination of the PDSCH scheduling delay and the HARQ-ACK delay, the first field having 1 bit, the second field having 3 bits.

3. The wireless communication method of claim 2, wherein the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13}.

4. The wireless communication method of claim 1, wherein the wireless communication device includes a half-duplex user equipment.

5. A wireless communication method, comprising:
transmitting, by a wireless communication node to a wireless communication device, a control signal indicating one of a plurality of physical downlink shared channel (PDSCH) scheduling delays and one of a plurality of hybrid automatic repeat request-acknowledgement (HARQ-ACK) delays, wherein the control signal includes 4 bits configured to indicate: (i) the PDSCH scheduling delay and (ii) the HARQ-ACK delay, wherein the control signal is configured to indicate a combination of the PDSCH scheduling delay and the HARQ-ACK delay, and wherein the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13};
transmitting, by the wireless communication node to the wireless communication device, a PDSCH; and
receiving, by the wireless communication node from the wireless communication device, a HARQ-ACK that corresponds to the received PDSCH.

6. The wireless communication method of claim 5, wherein the control signal includes a first field and a second field configured to collectively indicate the combination of the PDSCH scheduling delay and the HARQ-ACK delay, the first field having 1 bit, the second field having 3 bits.

7. The wireless communication method of claim 6, wherein the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13}.

8. The wireless communication method of claim 5, wherein the wireless communication device includes a half-duplex user equipment.

9. A wireless communication device, comprising:
at least one processor configured to:
receive, via a transceiver from a wireless communication node, a control signal indicating one of a plurality of physical downlink shared channel (PDSCH) scheduling delays and one of a plurality of hybrid automatic repeat request-acknowledgement (HARQ-ACK) delays, wherein the control signal includes 4 bits configured to indicate: (i) the PDSCH scheduling delay and (ii) the HARQ-ACK delay, wherein the control signal is configured to indicate a combination of the PDSCH scheduling delay and the HARQ-ACK delay, and wherein the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13};
receive, via the transceiver from the wireless communication node, based on the PDSCH scheduling delay, a PDSCH; and
transmit, via the transceiver to the wireless communication node, based on the HARQ-ACK delay, a HARQ-ACK that corresponds to the received PDSCH.

10. The wireless communication device of claim 9, wherein the control signal includes a first field and a second field configured to collectively indicate the combination of the PDSCH scheduling delay and the HARQ-ACK delay, the first field having 1 bit, the second field having 3 bits.

11. The wireless communication device of claim 10, wherein the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13}.

12. The wireless communication device of claim 9, wherein the wireless communication device includes a half-duplex user equipment.

13. A wireless communication node, comprising:
at least one processor configured to:
transmit, via a transceiver to a wireless communication device, a control signal indicating one of a plurality of physical downlink shared channel (PDSCH) scheduling delays and one of a plurality of hybrid automatic repeat request-acknowledgement (HARQ-ACK) delays, wherein the control signal includes 4 bits configured to indicate: (i) the PDSCH scheduling delay and (ii) the HARQ-ACK delay, wherein the control signal is configured to indicate a combination of the PDSCH scheduling delay and the HARQ-ACK delay, and wherein the combination is selected from at least one of: {2, 4}, {2, 5}, {2, 6}, {2, 7}, {2, 8}, {2, 9}, {2, 10}, {2, 11}, {2, 13}, {2, 15}, {2, 17}, {7, 12}, or {7, 13};

transmit, via the transceiver to the wireless communication device, a PDSCH; and receive, via the transceiver from the wireless communication device, a HARQ-ACK that corresponds to the received PDSCH.

14. The wireless communication node of claim 13, wherein the control signal includes a first field and a second field configured to collectively indicate the combination of the PDSCH scheduling delay and the HARQ-ACK delay, the first field having 1 bit, the second field having 3 bits.

\* \* \* \* \*